(12) United States Patent
Hirama

(10) Patent No.: US 7,082,287 B2
(45) Date of Patent: Jul. 25, 2006

(54) RADIO COMMUNICATION SYSTEM, RECEIVED SIGNAL STRENGTH INDICATOR COMPENSATING METHOD FOR RADIO COMMUNICATION SYSTEM, AND BASE STATION/TERMINAL STATION FOR RADIO COMMUNICATION SYSTEM

(75) Inventor: Atsuhiro Hirama, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 659 days.

(21) Appl. No.: 10/072,056

(22) Filed: Feb. 8, 2002

(65) Prior Publication Data
US 2002/0102972 A1 Aug. 1, 2002

Related U.S. Application Data

(63) Continuation of application No. PCT/JP99/04514, filed on Aug. 23, 1999.

(51) Int. Cl.
H04B 1/38 (2006.01)
H04B 17/00 (2006.01)

(52) U.S. Cl. .................. 455/70; 455/67.11; 455/88; 455/423; 455/226.2

(58) Field of Classification Search ............. 455/522, 455/69, 70, 88, 517, 437, 423, 226.1, 2, 67.11; 375/144, 148
See application file for complete search history.

(56) References Cited

U.S. PATENT DOCUMENTS

| 5,257,415 | A | 10/1993 | Kumagai et al. |
| 5,802,114 | A | 9/1998 | Koszarsky et al. |
| 5,912,922 | A | 6/1999 | Koszarsky et al. |
| 6,006,077 | A * | 12/1999 | Shull .................. 455/226.2 |
| 6,285,886 | B1 * | 9/2001 | Kamel et al. .............. 455/522 |

FOREIGN PATENT DOCUMENTS

| EP | 0 601 987 | 6/1994 |
| EP | 0 755 133 | 1/1997 |
| JP | 6-54009 | 2/1994 |
| JP | 6-54012 | 2/1994 |
| JP | 7-35800 | 2/1995 |
| JP | 11-298407 | 10/1999 |

OTHER PUBLICATIONS

Kazuo Mori, Transmission Power Control in CDMA Slotted-ALOHA Packet Radio Communications.Technical Report of IEICE. 1998, pp. 95-102.

(Continued)

*Primary Examiner*—Matthew Anderson
*Assistant Examiner*—Philip J. Sobutka
(74) *Attorney, Agent, or Firm*—Katten Muchin Rosenman LLP

(57) ABSTRACT

In a radio communication system (1), a base station (3) broadcasts, to mobile stations (2-1 to 2-n: n represents a natural number), a compensation parameter needed for compensation for a possible error in detection of a received signal strength indicator, occurring in the terminal stations (2-i: i=1 to n) due to a difference in transmission signal waveform to the terminal stations (2-i), and in the terminal stations (2-i), a received signal strength indicator compensating section (23-5) compensates for the received signal strength indicator detection error in a received signal strength indicator detecting section (22-10) on the basis of the compensation parameter broadcasted therefrom. This considerably improves the accuracy of the received signal strength indicator detection in the terminal stations (2-i).

19 Claims, 12 Drawing Sheets

OTHER PUBLICATIONS

K. Mori, "Study About Transmission Power Control in CDMA Slotted -Aloha Packet Radio Communications",The Institute of Electronics, Information and Communication Engineers Technical Research Report vol. 98, No. 159, pp. 95-102.

* cited by examiner

RADIO COMMUNICATION SYSTEM, RECEIVED SIGNAL STRENGTH INDICATOR COMPENSATING METHOD FOR RADIO COMMUNICATION SYSTEM, AND BASE STATION/TERMINAL STATION FOR RADIO COMMUNICATION SYSTEM

This application is a continuation of international application number PCTJP99/04514 filed Aug. 23, 1999.

TECHNICAL FIELD

The present invention relates to a radio communication system, received signal strength indicator compensating method for use in a radio communication system, and base station and terminal station for use in a radio communication system, suitable for reducing a received signal strength indicator detection error occurring on a terminal station side due to a difference in waveform (transmitted waveform) of a transmission signal from a base station to a terminal station.

BACKGROUND ART

As well known, a CDMA (Code Division Multiple Access) method, serving as one type of multiplex (multiple access) radio communication method, shows concealment and interference resistance, and is being used for diverse communication systems as a communication mode capable of achieving effective use of radio frequencies. In the recent years, this CDMA method is also being applied to mobile communication systems because of the solution to the problem involving "degradation of transmission quality stemming from considerable positional variation (or difference) of an individual terminal station existing a radio zone established by a radio base station" (referred to generally as a far-and-near problem).

Meanwhile, a study has been promoted for realizing a receiver ("software radio equipment") which deals with a plurality of modulation modes by downloading software handling the plurality of modulation modes to the minimum hardware according to each alteration of the modulation mode, and for example, it can be considered used as a regulatory apparatus on illegal radio equipment.

In addition, in the recent years, there exists an increasing need for the detection accuracy of a received signal strength indicator (RSSI) in these radio equipment (terminal stations). For example, for the solution to the foregoing "far-and-near problem", in general there is a need for the received signal strength indicator detection accuracy to be below ±1 dB, and also for the "software radio equipment", considering the estimation of the presence or absence of transmitted electric wave from an illegal radio equipment on the basis of a received signal strength indicator, a requirement exists for the improvement of the received signal strength indicator detection accuracy (usually, below ±several dB).

As well known, the aforesaid received signal strength indicator is detected by a received signal strength indicator (RSSI) detecting section placed in the interior of a receive system (receiver) of a radio equipment, and for example, this RSSI detecting section is frequently constructed as a logarithmic amplifier (LOG AMP) in which a plurality of operational amplifiers 101 are connected in a multistage fashion as shown in FIG. 11.

Moreover, in the RSSI detecting section (logarithmic amplifier) 100 shown in FIG. 11, the number of operational amplifiers 101 saturated increases (the number of operational amplifiers 101 operating linearly decreases) as the strength of an inputted (received) electric field becomes higher. Conversely, the number of operational amplifiers 101 saturated decreases (the number of operational amplifiers 101 operating linearly increases) with a lower inputted field strength.

Accordingly, for example, as FIG. 11 shows, if the values obtained by normalizing the input voltages to the respective operational amplifiers 101 by means of operational amplifiers 102 (for example, the output voltage of the operational amplifier 101 saturated is set at "1") are added to each other in an adder (Σ) 103, an output voltage value is obtainable according to the inputted field strength. FIG. 12 shows an example of an input field-output voltage characteristic of the logarithmic amplifier 100.

Furthermore, the received signal strength indicator of radio equipment is estimated (detected) on the basis of the output voltage value of the logarithmic amplifier 100 thus obtained, and in a conventional art, the output voltage value is converted into a received signal strength indicator detection value through the use of a memory in which received signal strength indicator detection (estimated) values to the output voltage values are recorded in the form of a table. For example, the logarithmic amplifier 100 has the input field-output voltage characteristic shown in FIG. 12, and when digital values obtained by the A/D conversion of the output voltage values are set as addresses of the aforesaid memory, the data to be recorded in this memory are taken as shown in the following table 1.

TABLE 1

| Example of Memory Data | | | | | | | | | | | |
|---|---|---|---|---|---|---|---|---|---|---|---|
| Output Voltage (v) | 0.4 to 0.5 | to 0.6 | to 0.7 | to 0.8 | to 0.9 | to 1.0 | to 1.1 | to 1.2 | to 1.3 | to 1.4 | to 1.5 |
| Address (hex) | 28 | 32 | 3C | 46 | 50 | 5A | 64 | 6E | 78 | 82 | 8C |
| Data (dBm) | −70 | −65 | −60 | −55 | −50 | −45 | −40 | −35 | −30 | −25 | −20 |
| Data (hex) | 46 | 41 | 3C | 37 | 32 | 2D | 28 | 23 | 1E | 19 | 14 |

For example, when the output voltage value of the logarithmic amplifier 100 assumes 0.84 V, as the table 1 shows, the memory read address is 50 (hex), and in this case, the received signal strength indicator is estimated to be −50 dBm. In like manner, for example, when the output of the logarithmic amplifier 100 is 1.26 V, the memory read address is 78 (hex), and the received signal strength indicator is estimated at −30 dBm.

Naturally, the direct use of the values recorded in advance in the memory causes the degradation of accuracy of the received signal strength indicator. For this reason, for the compensation of this degradation, an interpolation between data is made using linear approximation or the like. In the above-mentioned examples, the use of this linear approximation provides 0.84 V→53 dBm and 1.26 V→32 dBm, and the improvement of the accuracy is achievable.

However, in the case of the detection of the received signal strength indicator by the logarithmic amplifier 100 mentioned above, since the logarithmic amplifier 100 usually has an input field-output voltage characteristic depending upon an input waveform, an offset occurs in the output voltage value according to the type of waveform of a received signal. For example, in the configuration shown in FIG. 11, in a case in which the input (received) signal is a DC signal or a rectangular wave signal, when the input signal (input voltage) is taken as Vin and the output signal (output voltage) is taken as Vout, the transfer function of the logarithmic amplifier is represented by the following equation.

$$Vout = Vy \cdot LOG(Vin/Vx) \quad (1)$$

where Vx depicts an intercept voltage and Vy denotes a slope voltage, with both being a fixed voltage which determines the scaling of the logarithmic amplifier 100.

Thus, in a case in which the input signal is other than the DC signal and the rectangular wave signal, these signals serve as reference waves, and as the following table 2 shows, an offset (error) occurs in the output voltage value of the logarithmic amplifier 100.

TABLE 2

Output Voltage Offset Values to waveforms

| Input Waveform | Peak/Effective Value rms | Intercept Factor | Error (dB) to DC Signal |
|---|---|---|---|
| DC Signal | either | 1 | 0 |
| Rectangular Wave | either | 1 | 0 |
| Sine Wave | peak | 2 | −6.02 |
| Sine Wave | rms | $\sqrt{2}$ | −3.01 |
| Triangular Wave | peak | 2.718(e) | −8.68 |
| Triangular Wave | rms | 1.569(e/$\sqrt{3}$) | −3.91 |
| Gaussian Noise | rms | 1.887 | −5.52 |
| GSM *[1] Wave | rms | 1.507 | −3.56 |
| PDC *[2] Wave | rms | 1.511 | −3.59 |
| COMA *[3] Wave | rms | 2.128 | −6.56 |

In this table 2,
*[1] Global System for Mobile Communications (Modulation Mode: GMSK (Gaussian filtered Minimum Shift Keying)
*[2] Personal Digital Cellular (Modulation mode: $\pi/4$ Shift QPSK)
*[3] Code Division Multiple Access (Modulation Mode: QPSK for Both Modulation and Spread)

Accordingly, for example, in a CDMA system, since the received waveform in a terminal station with respect to the same carrier varies with the number of multiplexes (the number of Spread codes), an offset takes place in the output voltage value of the logarithmic amplifier 100, which causes an error in detection of the received signal strength indicator. For example, in the case of an N (Narrow band)-CDMA system, as FIG. 13 shows, since shifting occurs on an input field-output voltage characteristic of the logarithmic amplifier 100 according to the aforesaid number of multiplexes, even if the received (inputted) electric field is the same, an error up to approximately 4 dB occurs in a received signal strength indicator between when the number of multiplexes is "1" (single code) and when it is "60".

In the case of the CDMA system, this received signal strength indicator detection error in a terminal station leads to a decrease in the number of terminal stations a base station accommodates. In the CDMA system, this is because, upon the power-on of the terminal station, its own (terminal station) sending power value is determined on the basis of the performance of the present received wave and the received signal strength indicator detection value at that time is communicated to the base station so that a so-called "open loop processing" is conducted on the base station side to determine a sending power value to the terminal station according to the receive performance (received signal strength indicator detection value or the like) of a transmitted wave from the terminal station.

That is, in this "open loop processing", when the received signal strength indicator detection value shows an error in the terminal station, both the upstream sending power value from the terminal station to the base station and downstream sending power value from the base station to the terminal station can be determined to a sending power value larger than the sending power value needed actually, and in such a case, the interference component among the terminal stations increases, which limits the number of terminal stations communicable with the base station at the same time and at the same frequency. Moreover, naturally, this causes increased power consumption.

On the other hand, also in a terminal (multimode terminal) of a multimode handling system such as a TACS+N-CDMA system or the aforesaid "software radio equipment", a difference in transmission waveform from a base station to a terminal station originating from a difference in mode, such as a TACS/CDMA mode, or a difference in modulation mode produces a similar offset in the output voltage value of the logarithmic amplifier 100, which lowers the detection accuracy of the received signal strength indicator.

For preventing the lowering of the received signal strength indicator detection accuracy, for example, it is considered that the above-mentioned received signal strength indicator estimation memory is prepared for each mode or each modulation mode, but this consideration contributes to the enlargement of circuit scale.

The present invention has been developed in view of the above-mentioned problems, and it is an object of the invention to provide a radio communication system, received signal strength indicator compensating method for use in a radio communication system, and base station and terminal station for a radio communication system, capable of enhancing the detection accuracy of a received signal strength indicator by compensating for an error in detection of the received signal strength indicator in a terminal station.

DISCLOSURE OF INVENTION

For achieving the above-mentioned purpose, a radio communication system according to the present invention comprises a base station conforming to a desired radio communication node and a terminal station for making communications with this base station through the use of the radio communication node, and is characterized in that the base station and the terminal station include the following parts:

Base Station (1) a compensation parameter generating section for generating a compensation parameter needed for compensating for a possible error in detection of a received signal strength indicator, occurring in the terminal station stemming from a difference in transmission signal waveform to the terminal station; and (2) a transmitting section for transmitting the compensation parameter generated in the compensation parameter generating section, to the terminal station, Terminal Station (1) a received signal strength indicator detecting section for detecting a received signal strength indicator of the transmission signal from the base station through the use of a required amplifier; and (2) a received signal strength indicator compensating section for compensating for, on the basis of the compensation parameter from the base station, an error in detection of the received signal strength indicator in the received signal strength indicator detecting section, occurring according to the difference in transmission signal waveform due to an input-waveform-dependent input-output characteristic of the amplifier shows.

In the radio communication system thus constructed according to the present invention, abase station can transmit (inform of), to the terminal station, a compensation parameter for a received signal strength indicator in a terminal station, while the terminal station can compensate for an error in detection of a received signal strength indicator on the basis of this compensation parameter.

In this case, the foregoing radio communication node is a code division multiple access communication node, and if the waveform of a multiplexed signal to be transmitted to the terminal station varies according to the number of multiplexes, it is also appropriate that the compensation parameter generating section of the base station and the received signal strength indicator compensating section of the terminal station include the following parts:

Compensation Parameter Generating Section of Base Station (1) a multiplex number detecting section for detecting information on the number of multiplexes in a transmission multiplexed signal to the terminal station;

(2) a first correction memory section for previously storing a correction quantity on a received signal strength indicator on the basis of a difference in number of multiplexes of the transmission multiplexed signal; and (3) a first memory control section for reading out, from the first correction memory section, a correction quantity corresponding to the information on the number of multiplexes detected by the multiplex number detecting section as a compensation parameter for the terminal station, Received Signal Strength Indicator Compensating Section of Terminal Station (1) a correction quantity receiving section for receiving the correction quantity from the base station; and (2) a first detected signal strength indicator correcting section for correcting the received signal strength indicator, detected by the received signal strength indicator detecting section, according to the correction quantity received by the correction quantity receiving section.

With this configuration, the base station can derive a correction quantity on the received signal strength indicator from the first correction memory section on the basis of the number of multiplexes of a transmission multiplexed signal which serves as a factor of an error in detection of the received signal strength indicator in the terminal station, and inform the terminal station of the correction quantity. Accordingly, the terminal station can compensate for the error in detection of the received signal strength indicator without implementing special operations by correcting the detected received signal strength indicator according to the correction quantity received from the base state.

Thus, the detection accuracy on the received signal strength indicator is improvable in the terminal station in addition to the simplification and power-saving of the terminal station. In consequence, the sending power of the terminal station determined from the detected received signal strength indicator and the initial sending power of the base station assume an optimum value, which suppresses the drop of the communication performance due to the "far-and-near problem" and improves the utilization efficiency to increase the number of terminal stations to be accommodated in the base station, besides the power consumption in the terminal station and the base station is further reducible.

Furthermore, the foregoing radio communication node is also a code division multiple access communication node, and if the waveform of a transmission multiplexed signal to the terminal station varies according to the number of multiplexes, it is also appropriate that the compensation parameter generating section of the base station and the received signal strength indicator compensating section of the terminal station include the following parts:

Compensation Parameter Generating Section of Base Station (1) a multiplex number detecting section for detecting information on the number of multiplexes of a transmission multiplexed signal to the terminal station as a compensation parameter for the terminal station, Received Signal Strength Indicator Compensating Section of Terminal Station (1) a multiplex number receiving section for receiving the information on the number of multiplexes from the base station;

(2) a second correction memory section for previously storing a correction quantity on a received signal strength indicator on the basis of a difference in number of multiplexes of the transmission signal;

(3) a second memory control section for reading out a correction quantity corresponding to the information on the number of multiplexes, received by the multiplex number receiving section, from the second correction memory section; and (4) a second detected signal strength indicator correcting section for correcting the received signal strength indicator, detected by the received signal strength indicator detecting section, according to the correction quantity read out by the second memory control section.

With this configuration, in this case, after the information on the number of multiplexes of a transmission multiplexed signal from the base station is broadcasted to the terminal station, the terminal station obtains a correction quantity on a received signal strength indicator corresponding to the information on the number of multiplexes to correct the received signal strength indicator according to the correction quantity for compensating for an error in detection of the received signal strength indicator. Accordingly, the detection accuracy on the received signal strength indicator is improvable in the terminal station in addition to the simplification and power-saving of the terminal station, and also in this case, it is possible to suppress the lowering of the communication performance due to the "far-and-near problem", and to increase the number of terminal stations to be accommodated in the base station, and further to reduce the power consumption.

Still furthermore, the foregoing radio communication node is similarly a code division multiple access communication node, and if the waveform of a transmission multiplexed signal to the terminal station varies according to the number of multiplexes, it is also appropriate that the compensation parameter generating section of the base station and the received signal strength indicator compensating section of the terminal station include the following parts:

Compensation Parameter Generating Section of Base Station (1) a multiplex number detecting section for detecting information on the number of multiplexes of a transmission multiplexed signal to the terminal station as a compensation parameter for the terminal station, Received Signal Strength Indicator Compensating Section of Terminal Station (1) a multiplex number receiving section for receiving the information on the number of multiplexes from the base station;

(2) a third detected signal strength indicator correcting section for correcting a received signal strength indicator detected by the received signal strength indicator detecting section on the basis of the information on the number of multiplexes received by the multiplex number receiving section through the use of a predetermined arithmetic operation.

With this configuration, in this case, in the radio communication system, the terminal station corrects a received signal strength indicator on the basis of the information on the number of multiplexes broadcasted thereto from the base station through the use of a predetermined operation; therefore, as compared with the manner in which correction quantities are previously stored in a memory, in addition to the simplification of the terminal station, a correction with high accuracy is achievable, which accomplishes the size reduction of the terminal station and further enhances the detection accuracy on the received signal strength indicator in the terminal station.

Moreover, in a case in which each of the base station and the terminal station conforms to a plurality of types of modulation modes and a waveform of a transmission signal to the terminal station varies according to modulation mode, it is also appropriate that the aforesaid compensation parameter generating section of the base station is designed to generate information on a modulation mode for a transmission signal as the aforesaid compensation parameter while the aforesaid received signal strength indicator compensating section of the terminal station is designed to correct an error in detection of a received signal strength indicator which occurs according to a difference in transmission signal modulation mode due to an input-waveform-dependent input-output characteristic of the aforesaid amplifier on the basis of the information on the transmission signal modulation mode from the base station.

Thus, the terminal station can compensate for the detection error of a received signal strength indicator even in a case in which the radio communication system handles (conforms to) a plurality of types of modulation modes and a waveform of a transmission signal varies with a modulation mode, which improves the detection accuracy of the received signal strength indicator.

Meanwhile, in a case in which the base station is equipped with a plurality of transmission data generating sections each made to generate transmission data to be multiplexed as a multiplexed signal transmitted to the terminal station, it is also appropriate that the aforesaid multiplex number detecting section includes an enable signal counting section for counting the number of enable signals for the transmission data generating sections to detect the aforesaid information on the number of multiplexes. This enables the detection of the multiplex number information with a simple configuration.

In this case, if the aforesaid transmission data generating sections are separated into a plurality of groups and the aforesaid enable signal counting section is provided for each of the groups to count the number of enable signals in units of the groups and an adding section is provided to add up the count results in the enable signal counting sections for output the information on the number of multiplexes, then it is possible to speedup the counting of the number of enable signals.

In addition, it is also appropriate that the enable signal counting section uses each of the enable signals as a read address signal and includes a multiplex number detection memory section in which information on the number of multiplexes is previously stored in an address area corresponding to the read address signal. This enables reading out the multiplex number information corresponding to the number of enable signals from the multiple number detection memory section, and provides the multiplex number information without conducting the operation of counting the number of enable signals, thus speeding up the multiplex number detection.

BEST MODE FOR CARRYING OUT THE INVENTION

Embodiments of the present invention will be described hereinbelow with reference to the drawings.

(A) Description of First Embodiment

Figure 1:
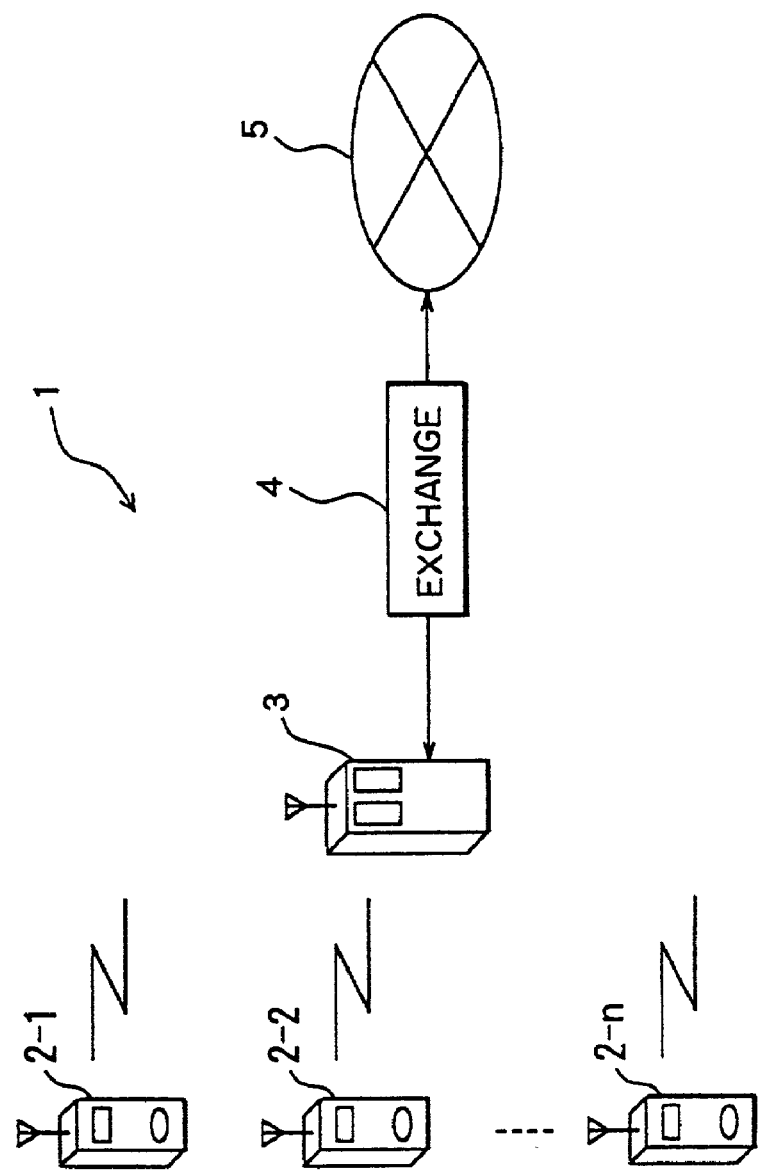
FIG. 1 is a block diagram showing a configuration of a CDMA communication system (radio communication system) according to a first embodiment of the present invention.

FIG. 1 is a block diagram showing a CDMA communication system (radio communication system) according to a first embodiment of the present invention. In FIG. 1, a CDMA communication system 1 (which sometimes will hereinafter be referred to simply as a "communication system 1") is made up of a base station 3 conforming to the CDMA method, a plurality of mobile stations (terminal stations) 2-1 to 2-$n$ ($n$ represents a natural number) capable of making communications with the base station 3 according to the CDMA method within a radio communication zone (visitor zone) of the base station 3, and an exchange 4 for making the data interchange between the base station 3 and a network 5.

Figure 2:
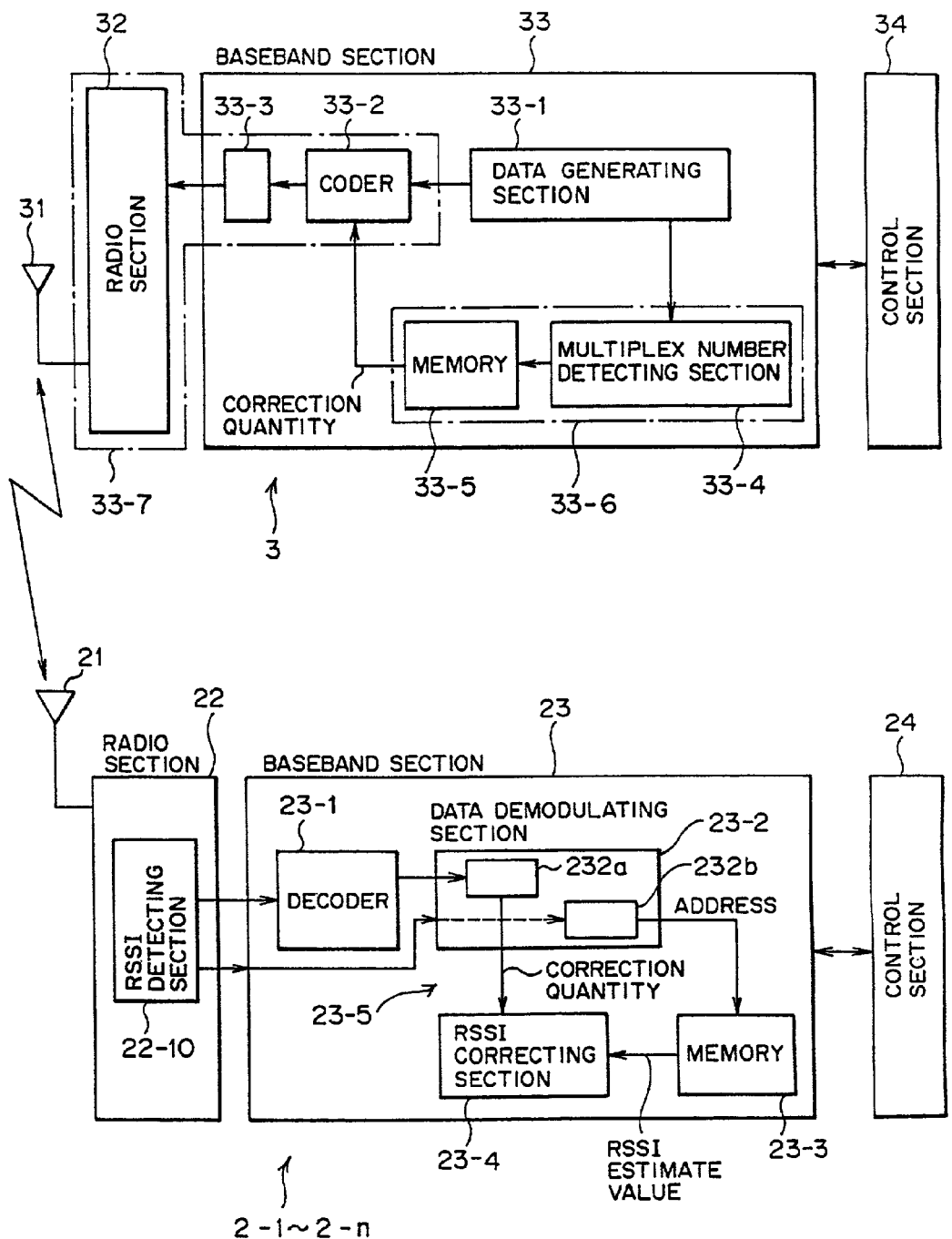
FIG. 2 is a block diagram showing configurations of a base station and a mobile station in the CDMA communication system according to the first embodiment.

The terminal station 2-1 to 2-$n$ and the base station 3 are constructed, for example, as shown in FIG. 2. That is, the base station 3 has an essential part composed of a radio antenna 31, a radio section (RF/IF section) 32, a baseband section 33 and a control section 34, while each of the mobile stations 2-$i$ ($i$=1 to n) is composed of a radio antenna 21, a radio section (RF/IF section) 22, a baseband section 23 and a control section 24.

In the base station 3, the radio section 32 takes charge of processing on radio waves to/from the mobile stations 2-$i$, and for example, is made to downconvert successively a radio wave (radio frequency (RF) signal) from the mobile station 2-$i$ into an IF (Intermediate Frequency) signal→a baseband signal for outputting it to the baseband section 33, while, conversely, upconverting successively a transmission signal (baseband signal) to the mobile station, produced in the baseband section 33, into an IF signal→an RF signal for transmitting it through the radio antenna 31 to the mobile station 2-$i$.

The baseband section 33 is for generating a transmission signal (baseband) to the mobile station 2-$i$ under the control of the control section 34 and for conducting the receive processing on a received signal from the mobile station 2-$i$, and a transmission system thereof, forming an essential part of this embodiment, includes a data generating section 33-1, a coder (CODER) 33-2, a modulating section 33-3, a multiplex number detecting section 33-4 and a memory section 33-5.

Figure 3:
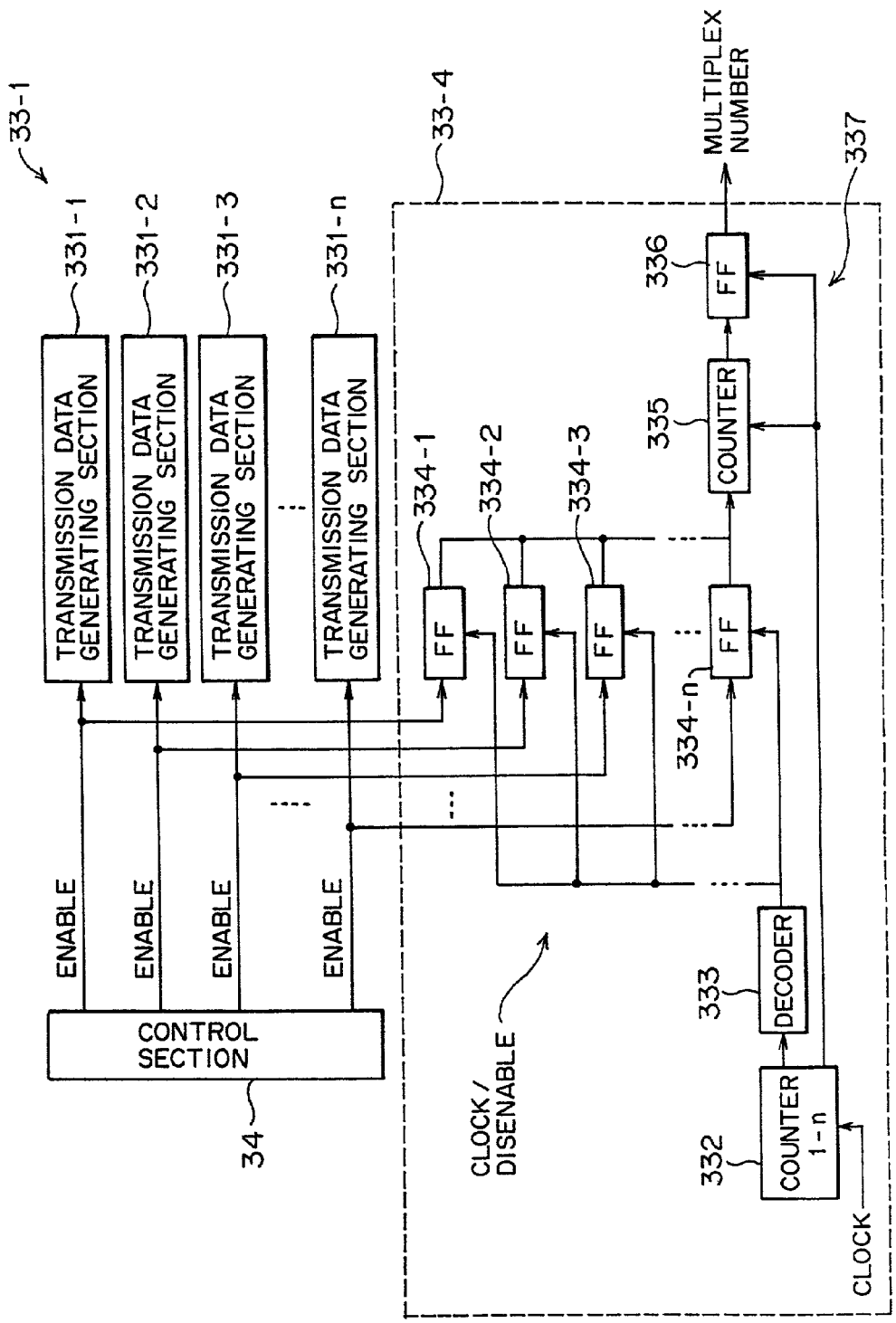
FIG. 3 is a block diagram showing a detailed example of configurations of a data generating section and a multiplex number detecting section in the base station illustrated in FIG. 2.

The data generating section 33-1 is for generating transmission (sending) data to each mobile station 2-$i$ under the control of the control section 34, and includes transmission data generating sections 331-1 to 331-$n$ for generating transmission channel data for each of the mobile stations 2-$i$, as shown in FIG. 3.

The coder 33-2 is for coding transmission channel data (which hereinafter will equally be referred to simply as "transmission data") addressed to each of the mobile stations 2, produced in the data generating section 33-1, and further for spreading through the use of a predetermined code (spread code) allocated to the mobile station 2-$i$. In this embodiment, as will be mentioned later, the coder 33-2 is also capable of storing (mapping) a correction quantity for a received signal strength indicator (RSSI) detection value at the mobile station 2-$i$, read out from the memory 33-5, in a broadcasting channel signal format for broadcasting the correction quantity through a broadcasting channel (BCCH) to the mobile stations 2.

The modulating section 33-3 is for modulating the output [transmission signal after spread (transmission multiplexed signal)] of the coder 33-2 according to QPSK (Quadrature Phase Shift Keying), with the transmission multiplexed signal after the modulation being upconverted into an IF signal→an RF signal in the radio section 32 and then transmitted though the radio antenna 31 to the mobile station 2-$i$.

The multiplex number detecting section 33-4 is for detecting the number of multiplexed channels in the transmission multiplexed signal having the same carrier (which sometimes will be referred to hereinafter as "transmission channel multiplex number"), and in this embodiment, for example, it is, as shown in FIG. 3, composed of n-scale counters 332, 335, a decoder 333 and flip-flop (FF) circuits 334-1 to 334-$n$, 336. The count values of the n-scale counter 332 are sequentially decoded to successively generate enable signals for the FF circuits 334-$i$, and the enable signals cause the n-scale counter 335 successively count up by the number of FF circuits 334-$i$ latching enables signals for transmission data generating sections 331-$i$.

When the count period of the n-scale counter 332 comes to an end, by means of a carry-out signal, the count value (the number of enable signals) of the n-scale counter 335 at that time is outputted as the number of multiplexed channels of a received transmission multiplexed signal. Incidentally, at this time, the n-scale counter 335 is reset by the aforesaid carry-out signal.

That is, the n-scale counters 332, 335, the decoder 333 and the flip-flop (FF) circuits 334-1 to 334-$n$, 336 constitute an enable number counter (enable signal counting section) 337 for counting the number of enable signals for the transmission data generating sections 331-$i$ to detect the transmission channel multiplex number on the same carrier.

Furthermore, the aforesaid memory section (first correction memory section) 33-5 is for previously storing a correction quantity for a received signal strength indicator which corresponds to a difference in transmission channel multiplex number on the same carrier. For example, in this case, a correction quantity (dBm or the like) for an RSSI detection error occurring in the mobile station 2 with respect to the transmission channel multiplex number is retained in a manner that this multiplex number is used as an address, thereby holding an RSSI correction table in which the transmission channel multiplex number is associated with the RSSI correction quantity.

The RSSI correction quantity retained in an address area corresponding to an address which is the transmission channel multiplex number detected by the aforesaid multiplex number detecting section 33-4 is read out from the RSSI correction table and fed to the coder 33-2, and the RSSI correction quantity is put in a broadcasting channel signal format (which will hereinafter be referred to as "broadcasting channel data") by the coder 33-2 and broadcasted through the broadcasting channel to the mobile station 2-$i$. Incidentally, the transmission multiplexed signal (main signal) is transmitted as communication channel data through the communication channel to the mobile station 2-$i$.

Figure 5:
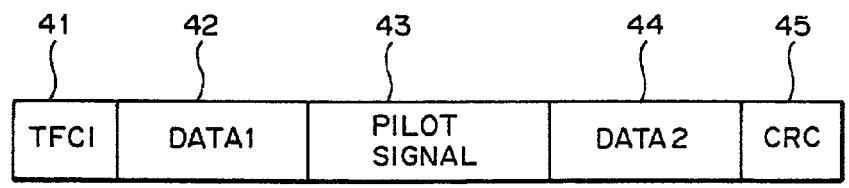
FIG. 5 is an illustration of an example of a format for broadcasting channel data.

In this case, for example, as FIG. 5 shows, the broadcasting channel data comprises a synchronization signal (TFCI) part 41, data signal parts 42, 44, a pilot signal part 43 and a CRC (Cyclic Redundancy Check) signal part 44. The coder 33-2 inserts (stores) the above-mentioned correction quantity, for example, in the data signal part 42 or 43 (or in both) of this format, thereby realizing the above-mentioned function.

That is, the multiplex number detecting section 33-4 and the memory section 33-5 function as a compensation parameter generating section 33-6 which generates an RSSI correction quantity as a compensation parameter to be used for the correction of a possible RSSI detection error occurring in the mobile station 2-*i* stemming from a difference in waveform due to a difference in transmission channel multiplex number for the mobile station 2-*i*, and in this embodiment, the coder 33-2, the modulating section 33-3 and the radio section 32 function as a transmitting section 33-7 which transmits, to the mobile station 2-*i*, the compensation parameter (RSSI correction quantity) generated by the compensation parameter generating section 33-6.

Moreover, in this embodiment, the multiplex number detecting section 33-4 also functions as a first memory control section which supplies the detected transmission channel multiplex number as an address for the memory section 33-5 for reading out a correction quantity corresponding to this multiplex number as an RSSI correction quantity for the mobile station 2-*i* from the memory section 33-5.

Secondly, in the mobile station 2-*i*, the radio section 22 successively downconverts the transmission multiplexed signal (RF signal), received from the base station 3, into an IF signal a baseband signal, and outputs it to the baseband section 23, while successively upconverting a transmission signal (baseband signal) for the base station 3, generated in the baseband section 23, into an IF signal→an RF signal to transmit it through the radio antenna 21 to the base station 3 side. In this radio section 22, the detection of RSSI is made on a transmission multiplexed signal from the base station 3.

Figure 4:
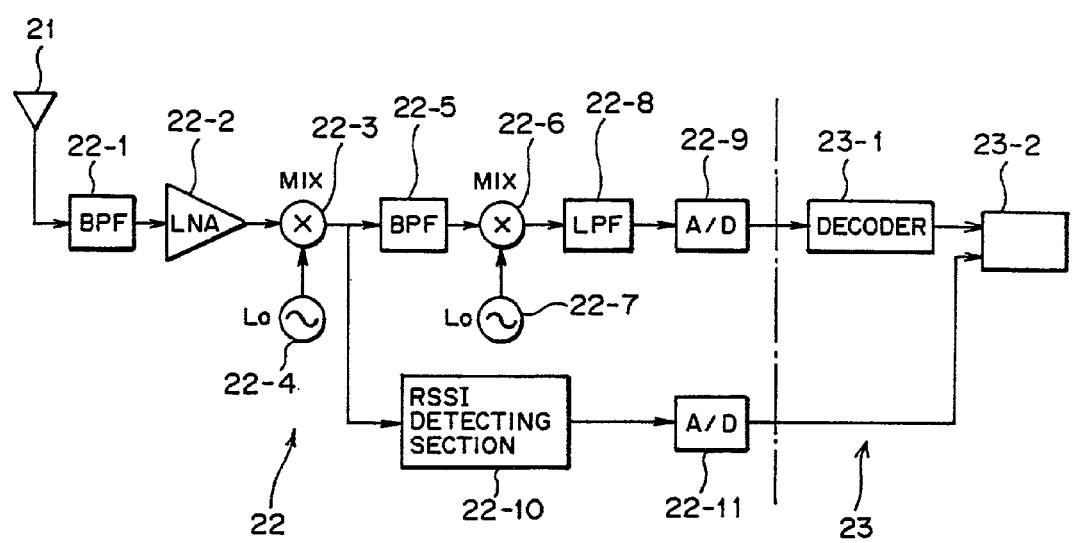
FIG. 4 is a block diagram showing a detailed example of a configuration of a radio section in the mobile station illustrated in FIG. 2.

Accordingly, the radio section 22 has a receive system forming an essential part constructed, for example, as shown in FIG. 4. That is, it is composed of a band-pass filter (BPF) 22-1, a low-noise amplifier (LNA) 22-2, a mixers (MIX) 22-3, 22-6, a local oscillators (Lo) 22-4, 22-7, a low-pass filter (LPF) 22-8, analog/digital (A/D) converters 22-9, 22-11 and a received signal strength indicator (RSSI) detecting section 22-10.

The BPF 22-1 permits the passing of only a desired frequency component of a transmission multiplexed signal (which will equally be referred to hereinafter as a "received signal") transmitted from and base station 3 and received by the radio antenna 21 for removing unnecessary components such as noises in the received signal. The LNA 22-2 is for amplifying the output of this BPF 22-1 up to a desired level while suppressing noises.

The mixer 22-3 is for mixing the output of the LNA 22-3 with the output of the local oscillator 22-4 to downconvert the received signal (RF signal) into an IF signal, the BPF 22-5 is for making a desired frequency component of the received signal after downconverted pass therethrough to remove unnecessary components such as noises.

The mixer 22-6 is for mixing the output of the BPF 22-5 with the output of the local oscillator 22-7 to downconvert the received signal (IF signal) into a baseband signal, and the LPF 22-8 permits the passing of only a desired frequency component of the received signal after downconverted for removing unnecessary components such as noises.

The A/D converter 22-9 is for converting the output (analog signal) of the LPF 22-8 into a digital signal, with the received signal (baseband signal) converted into the digital signal being outputted as a received main signal to a decoder 23-1 (which will be mentioned later) of the baseband section 23.

Figure 11:
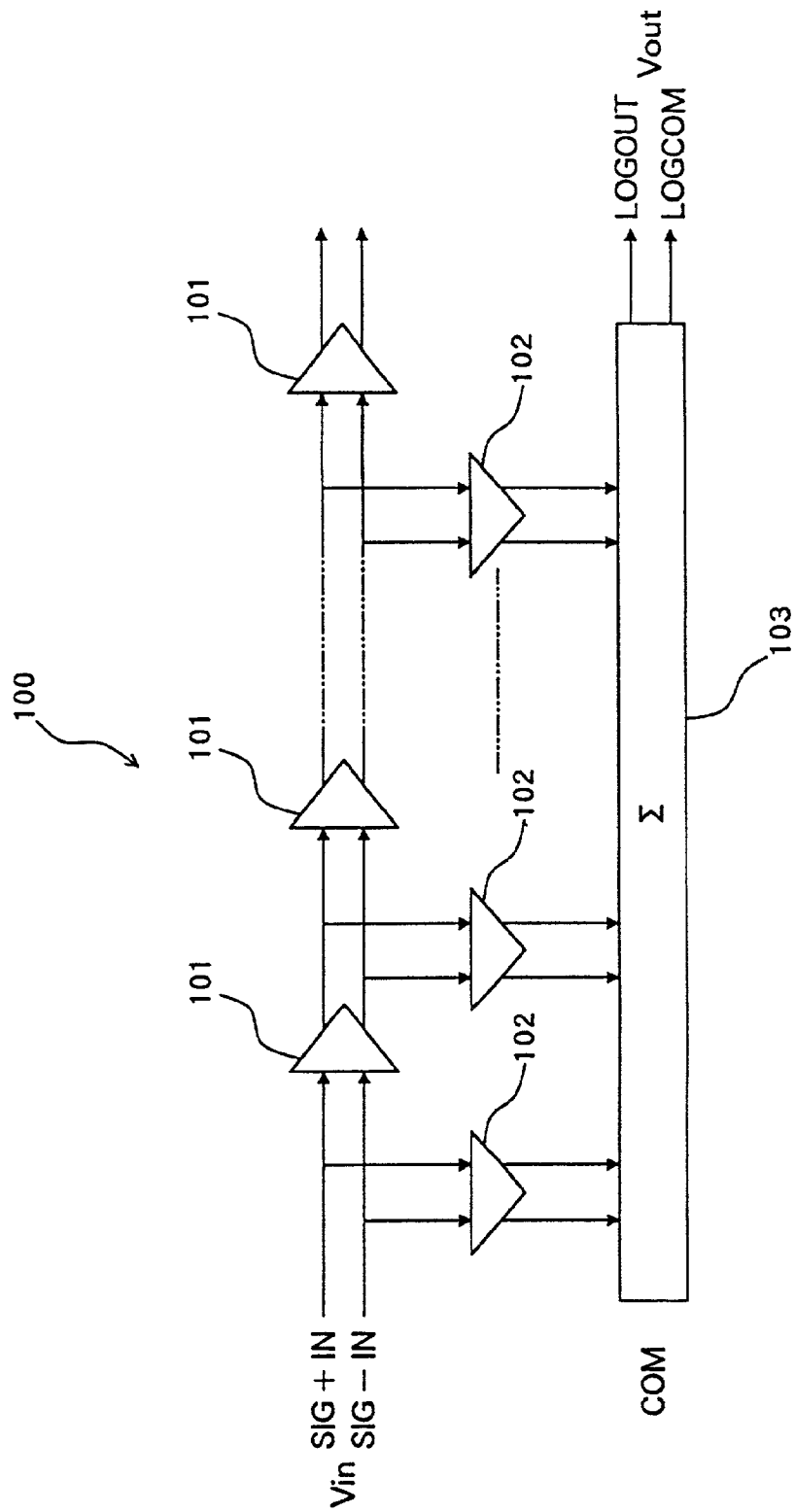
FIG. 11 is a block diagram showing an example of a configuration of a received signal strength indicator (RSSI) detecting section (logarithmic amplifier).

The RSSI detecting section 22-10 receives, as an input signal, the received signal (IF signal) after downconverted by the mixer 22-3 for detecting an RSSI signal value from this input signal. As well as that mentioned above with reference to FIG. 11, it is based on a logarithmic amplifier 100.

The A/D converter 22-11 is for converting the RSSI value (output voltage value) detected by the RSSI detecting section 22-10 into a digital value, with this digital value being outputted to a data demodulating section 23-2 (which will be mentioned later) of the baseband section 23.

The baseband section 23 generates a transmission signal (baseband signal) for the base station 3 under control of the control section 24 and conducts the receive processing on a received signal (baseband signal) obtained from the base station 3 through the radio section 22. For these functions, a receive system forming an essential part according to this embodiment includes a decoder (DECODER) 23-1, a data demodulating section 23-2, a memory section 23-3 and an RSSI correcting section 23-4.

The decoder 23-1 is for decoding a received main signal from the radio section 22, and the data demodulating section 23-2 is for demodulating the received main signal after decoded in the decoder 23-1, and in this case, additionally conducts the receive processing peculiar to the CDMA node, including inverse spread by a plurality of inverse spreading sections, a rake synthesis on received main signals after inverse-spread, and others.

Moreover, in addition to the above-mentioned basic features, in this embodiment, this data demodulating section 23-2 includes an RSSI correction quantity extracting section (correction quantity receiving section) 232*a* for extracting the aforesaid RSSI correction quantity from the base station 3, which exists in said aforesaid broadcasting channel data (see FIG. 5) and a memory control section 232*b* for generating a read address for the memory section 23-3 corresponding to the RSSI value detected by the RSSI detecting section 22-10 of the radio section 22.

Figure 12:
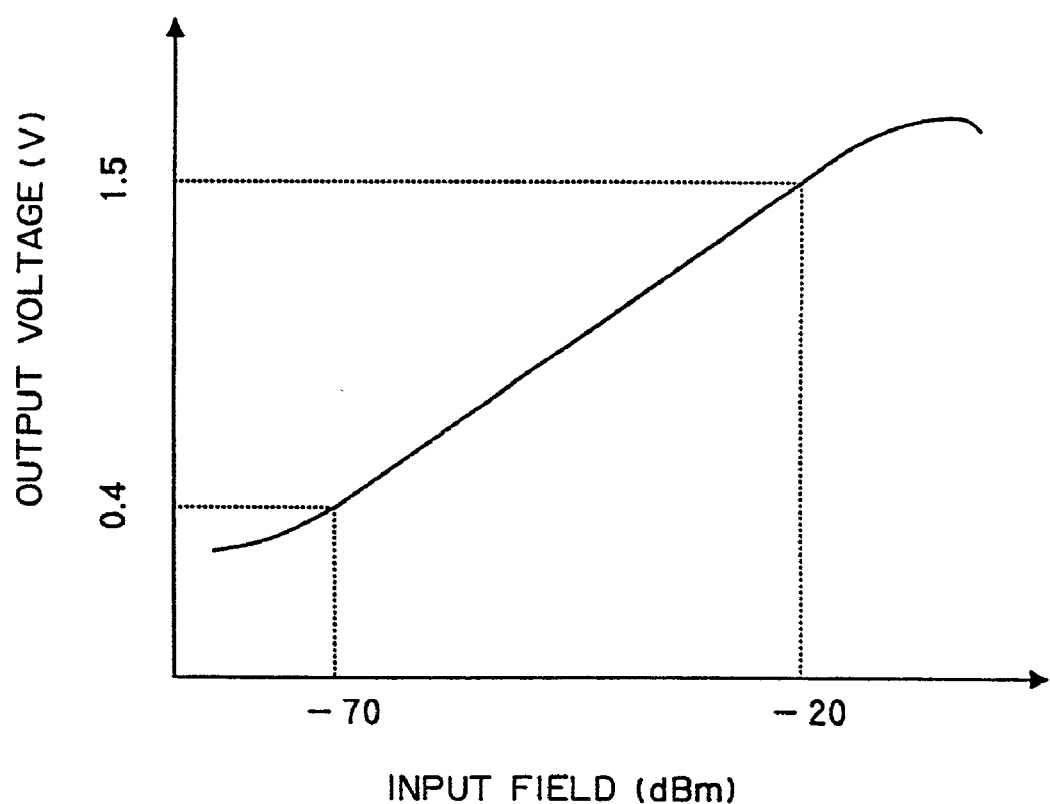
FIG. 12 is an illustration of an example of a input field-output voltage characteristic of the logarithmic amplifier illustrated in FIG. 11.
Figure 13:
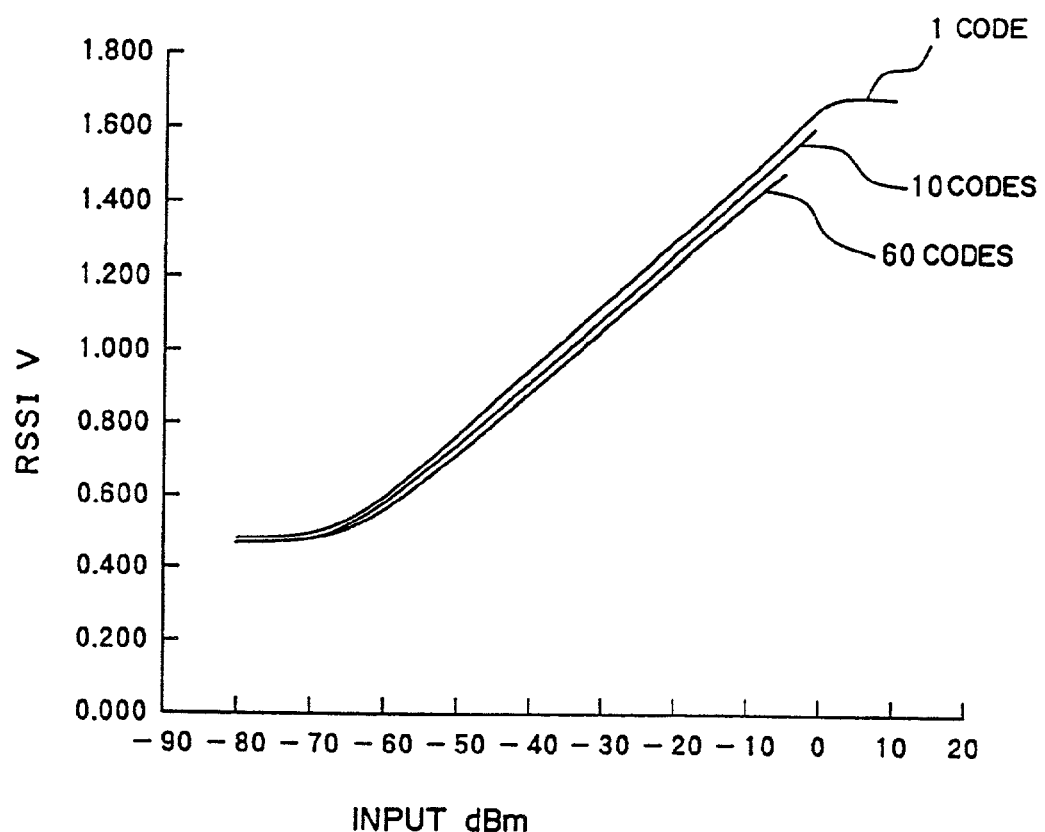
FIG. 13 is an illustration for describing a departure of an input field-output voltage characteristic due to a difference in number of codes (number of multiplexes) of the logarithmic amplifier illustrated in FIG. 11.

The memory section 23-3 is for previously storing RSSI detection (estimated) values with respect to output voltage values from the RSSI detecting section 22-10 (logarithmic amplifier 100) of the radio section 22 in the form of a table, and also in this embodiment, the logarithmic amplifier 100 has an input field-output voltage characteristic shown in FIG. 12, and when the digital values obtained by A/D-converting the aforesaid output voltages in the A/D converter 22-11 are set as addresses of the memory section 23-3, the data to be recorded in this memory becomes as shown in the aforesaid table 1.

The RSSI correcting section (first detected signal strength indicator correcting section) 23-4 is for correcting an RSSI value read out from the memory section 23-3 according to a correction quantity extracted in the aforesaid RSSI correction quantity extracting section 232*a*. This corrects an error in detection of the RSSI by the RSSI detecting section 22-10, which error occurs according to a difference in transmission channel multiplex number on the same carrier from the base station 3.

That is, the aforesaid RSSI correction quantity extracting section 232*a* and RSSI correcting section 23-4 function as an RSSI compensating section 23-5 which compensates for an error in RSSI detection in the RSSI detecting section 22-10, which occurs according to a difference in transmission channel multiplex number from the base station 3 due to an input-output characteristic dependent on an input waveform the logarithmic amplifier 100 shows, on the basis of an RSSI correction quantity (compensation parameter) from the base station 3.

A description will be given hereinbelow of an operation of a CDMA communication system 1 thus constructed according to the first embodiment.

First of all, in the base station 3, when transmission data is generated in the data generating section 33-1 (each transmission data generation section 331-*i*), this transmission data is coded in the coder 33-2 and is spread with a predetermined spread code allocated to each mobile station 2-*i*. Subsequently, they are multiplexed into a transmission multiplexed signal and outputted to the modulating section 33-3.

At this time, in the multiplex number detecting section 33-6, an enable number counter 337 (which will equally be referred to hereinafter as a "transmission enable number counter 337") counts the number of enable signals to each transmission data generating section 331-*i* for detection of the transmission channel multiplex number, with an RSSI correction quantity corresponding to the detected multiplex number being read out from the memory section 33-5.

The RSSI correction quantity read out from the memory section 33-5 in this way is stored in broadcasting channel data (see FIG. 5) by the coder 33-2 as mentioned above, and spread with a broadcasting channel spread code and QPSK-modulated in the modulating section 33-3, and then broadcasted through broadcasting channels to the mobile stations 2-*i*. Incidentally, the transmission multiplexed signal is modulated as communication channel data in the modulating section 33-3 and then transmitted through the communication channel.

On the other hand, in the mobile station 2-*i*, when receiving the broadcasting channel data from the base station 3 though the broadcasting channel (it is obtained by performing the inverse spread using a code previously allocated for the broadcasting channel), the RSSI correction quantity extracting section 232*a* of the data demodulating section 23-2 extracts an channel data and supplies it to the RSSI correcting section RSSI correction quantity from the broadcasting channel data and supplies it to the RSSI correcting section 23-4.

The RSSI correcting section 23-4 corrects the RSSI of the received identical-carrier main signal from the base station 3 through the communication channel, estimated on the basis of the output voltage of the RSSI detecting section 22-10 in the memory section 23-3, according to the aforesaid RSSI correction quantity obtained by the RSSI correction quantity extracting section 232*a*. This compensates for an error in RSSI detection occurring due to a difference in the number of multiplexes of the received main signal stemming from the input-waveform-dependent input-output characteristic of the logarithmic amplifier 100 of the RSSI detecting section 22-10.

As described above, with the CDMA communication system 1 according to this embodiment, an RSSI correction quantity is broadcasted from the base station 3 to the mobile station 2-*i*, and in the mobile station 2-*i*, the RSSI detected using the logarithmic amplifier 100 is corrected by the correction quantity to compensate for (correct) an error in the RSSI detection occurring according to a difference in multiplex number stemming from the input-output characteristic with input waveform dependency the logarithmic amplifier 100 retains, which considerably improves the RSSI detection accuracy in the mobile stations 2-*i*.

Accordingly, in particular, in the case of the CDMA communication system 1, in the aforesaid "open loop processing", since the transmission power of the mobile station 2-*i* and the base station 3 are determined to be a more appropriate value, it is possible to achieve the power-saving, the suppression of drop of the communication performance cased by the "far-and-near problem", the increase in number of mobile stations to be accommodated from the improvement of frequency utilization efficiency, and others.

In addition, in the above-described embodiment, an RSSI correction quantity is obtained on the base station 3 side and the correction quantity is broadcasted to the mobile stations 2-*i*; therefore, this eliminates the need for the mobile stations 2-*i* to contain memory or arithmetic operations for the acquisition of a correction quantity, which contributes greatly to the size reduction of the mobile stations 2-*i*.

Figure 6:
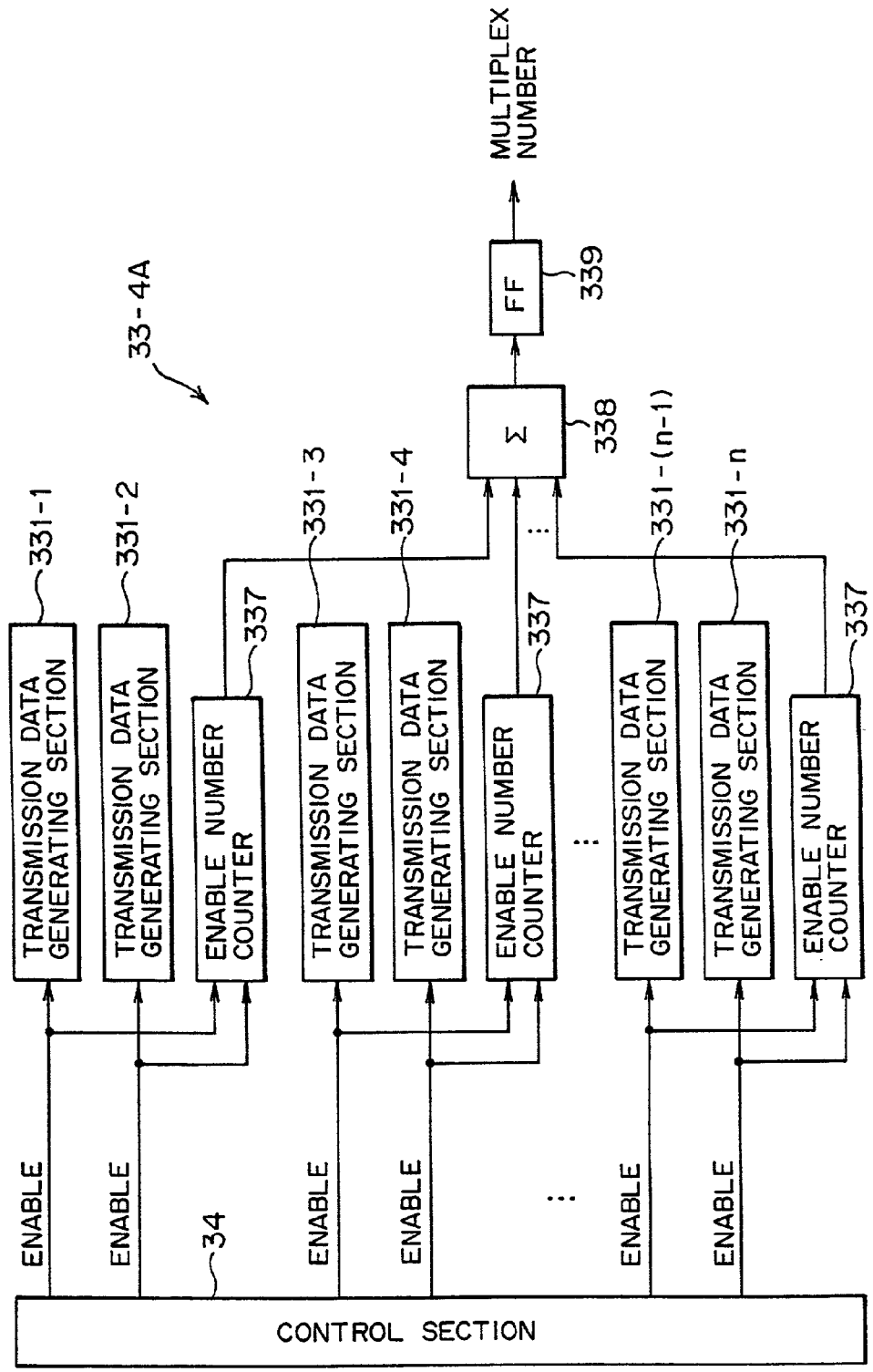
FIGS. 6 and 7 are block diagrams showing modifications of the data generating section and multiplex number detecting section illustrated in FIG. 3.
Figure 7:
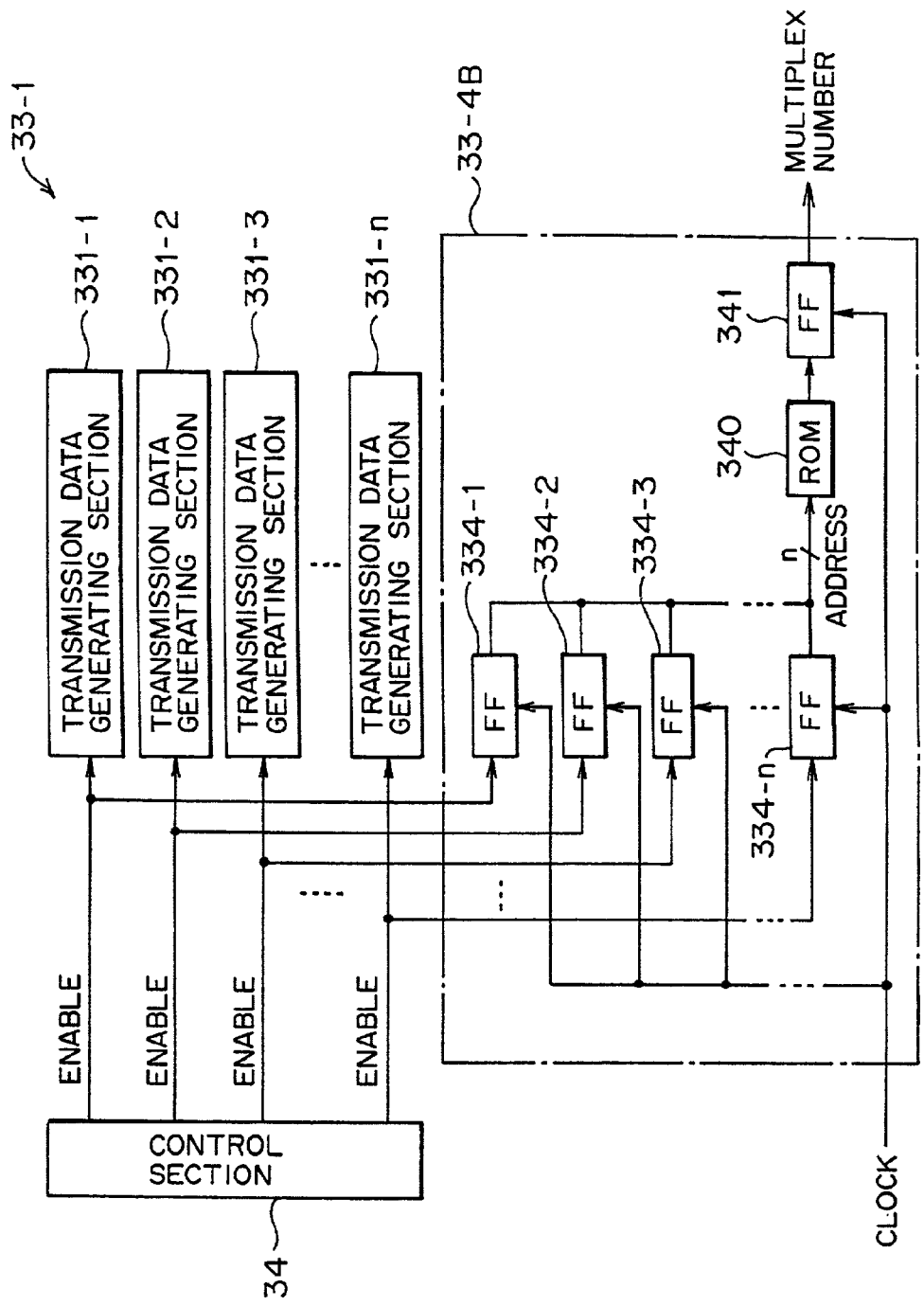

Meanwhile, the aforesaid multiplex number detecting section 33-4 can also be constructed, for example, as shown in FIG. 6 or 7.

First, a description will be given hereinbelow of a multiplex number detecting section 33-4A shown in FIG. 6. In this multiplex number detecting section 33-4A, transmission data generating sections 331-*i* are separated into a plurality of groups (in FIG. 6, one group comprises two transmission data generating sections 331-*i*), and an enable number counter 337 for each call, similar to that mentioned above with reference to FIG. 3, is provided for each of the groups and an adding section ($\Sigma$) 338 is provided to add up the outputs (count results) of the respective enable number counters 337. Numeral 339 represents an FF circuit for temporarily holding the output of the adding section 338.

Thus, in the multiplex number detecting section 33-4A, since the number of enable signals from the control section 34 to the transmission data generating sections 331-*i* is counted in units of groups by the enable number counters 337, as compared with the configuration described above with reference to FIG. 3, the considerable speed-up of the enable signal counting operation is achievable and the detection of the multiplex number of the transmission multiplexed signal can reach completion for a shorter time.

On the other hand, a multiplex number detecting section 33-4B shown in FIG. 7 is made up of FF circuits 334-1 to 334-*n*each for holding an enable signal from the control section 34 to each transmission data generating section 331-*i*, a ROM (memory section for multiplex number detection) 340 for receiving the outputs of these FF circuits 334-*i* as an n-bit read address signal, for example, if each of the outputs of the FF circuits 334-*i* is a 1-bit signal to previously store the number of multiplexes at an address area corresponding to this read address signal, and an FF circuit 341 for temporarily holding the output of the ROM 340.

Thus, in this multiplex number detecting section 33-4B, on the basis of the n-bit read address signal expressed by a combination of the outputs (1, 0) of the FF circuits 334-1 to 334-*n*, the number of multiplexes stored at an address area of the ROM 340 corresponding to that address signal is read out and outputted as a multiplex number detection value.

For simplification of description only, taking n=3 for instance, the multiplex number "1" is previously stored in each of the areas corresponding to the addresses "001", "010" and "100", the multiplex number "2" in each of the areas corresponding to the addresses "011" and "110", and the multiplex number "3" in the area corresponding to the address "111". That is, the number of "1" of the n-bit address is stored as a multiplex number in advance.

In this status, for example, if an enable signal is fed to only the transmission data generating sections 331-1 and 331-3, only the outputs of the FF circuits 334-1 and 334-3 become "1", and the read address signal assumes "101". Accordingly, the multiplex number "2" stored in an area specified by the address "101" is read out from the ROM 340, and outputted as the detected multiplex number.

As described above, in this case, in the multiplex number detecting section 33-4B, the number of "1" of the n-bit address is previously stored as a multiplex number in each address area of the ROM 340 and then enables signals for the transmission data generating sections 331-1 to 331-n are made as an n-bit read address signal for the ROM 340. This eliminates the need for the enable signal counting operation (that is, the aforesaid n-scale counters 332 and 335), thus achieving further speed-up of the multiplex number detection and shortening the time to be taken until the completion of the detection.

Incidentally, if the configuration shown in FIG. 7 is applied to the enable number counter 337 of each group mentioned above with reference to FIG. 6, then it is possible to achieve further speed-up of the multiplex number detection. However, in this case, because of requiring the ROM 340, it results in an unuseful manner if importance is attached to the size reduction.

(A1) Description of First Modification of First Embodiment

In the above-described embodiment, although an RSSI correction quantity is obtained on the basis of the number of multiplexes detected by the multiplex number detecting section 33-4 (or 33-4A, 33-4B) on the base station 3 side and is broadcasted to the mobile stations 2-i side, it is also appropriate that, for example, only the number of multiplexes is broadcasted from the base station 3 to the mobile stations 2-i while an RSSI correction quantity is obtained from the number of multiplexes in the mobile stations 2-i.

Figure 8:
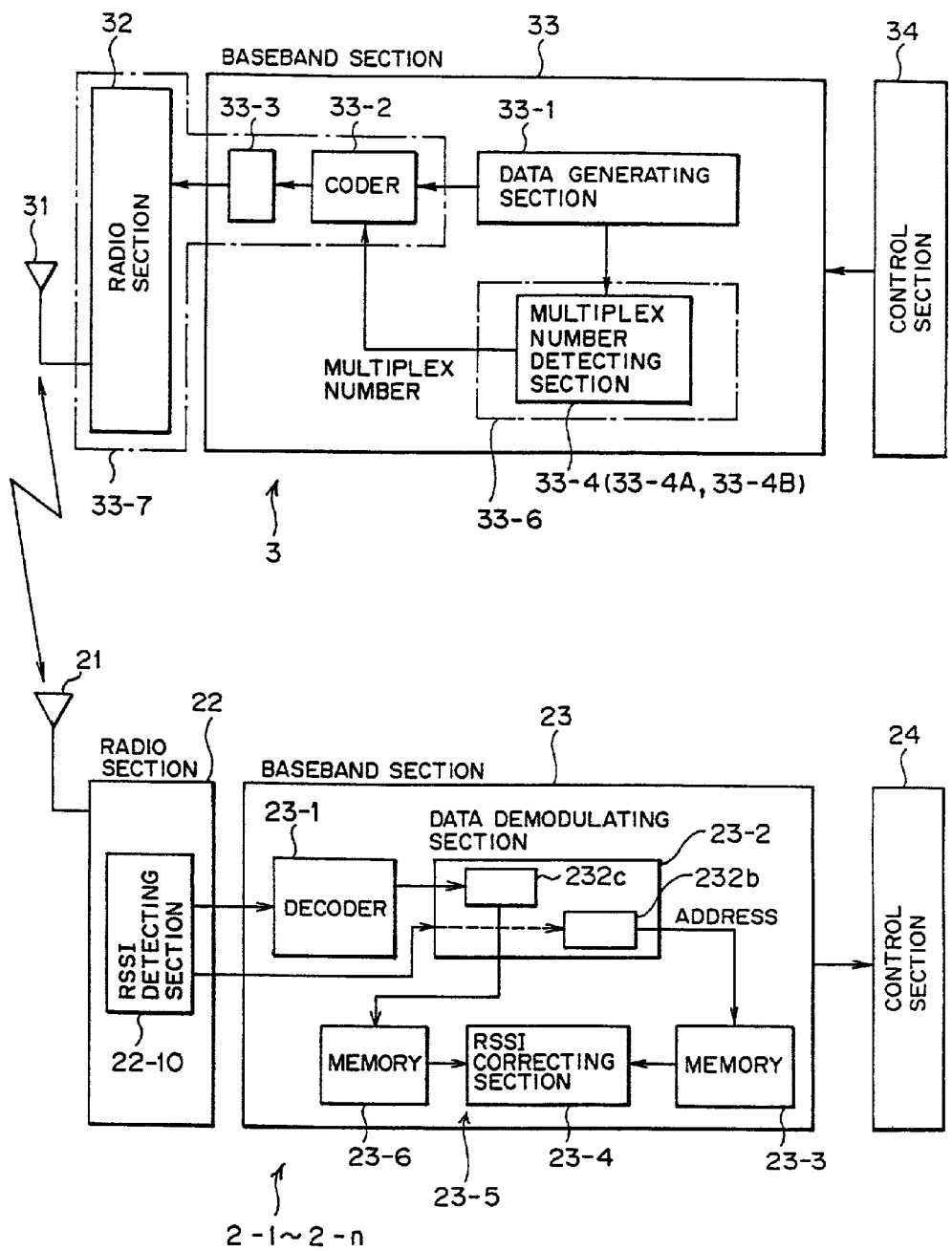
FIG. 8 is a block diagram showing a first modification of the base station and the mobile station illustrated in FIG. 2.

That is, for example, as FIG. 8 shows, this removes the memory 33-5 from the base station 3, but adds a memory 23-6 to the mobile station 2 and a multiplex number extracting section 232c to the data demodulating section 23-2. Incidentally, in FIG. 8, the same reference numerals as those used in FIG. 2 represent the same or similar parts.

In this case, the memory (second correction memory section) 23-6 is for storing RSSI correction quantities corresponding to different numbers of multiplexes of transmission multiplexed signals (received main signals) from the base station 3 as well as the aforesaid memory section 33-5, and the multiplex number extracting section (multiplex number receiving section) 232c is for extracting (receiving) the number of multiplexes, stored on the base station 3 side, from the received main signal (broadcasting channel data).

Thus, in the base station 3, the number of multiplexes detected by the multiplex number detecting section 33-4 (or 33-4A, 33-4B) is stored intact as an RSSI compensation parameter in the broadcasting channel data by the coder 33-2, and broadcasted through a broadcasting channel to the mobile station 2-i.

Furthermore, in the mobile station 2-i, the number of multiplexes is extracted by the multiplex number extracting section 232c of the data demodulating section 23-2 and is used as an address so that an RSSJ correction quantity corresponding to the number of multiplexes is read out from the corresponding address area. That is, the multiplex number extracting section 232c also functions as a second memory control section for reading out the correction quantity corresponding to the extracted multiplex number from the memory 23-6.

Moreover, the correction quantity read out from the memory section 23-6 as mentioned above is fed to the RSSI correcting section 23-4 where the RSSI on the received main signal received from the base station 3 through a communication channel, which is detected by the RSSI detecting section 22-10 and the memory section 23-3, is corrected according to the aforesaid RSSI correction quantity from the memory section 23-6.

This compensates for an error in the RSSI detection occurring a difference in multiplex number between the received main signals, stemming from the input-waveform-dependent input-output characteristic of the logarithmic amplifier 100 of the RSSI detecting section 22-10.

That is, in this case, the RSSI correcting section 23-4 functions as a second detected signal strength indicator correcting section for correcting the RSSI, detected by the RSSI detecting section 22-10, according to the RSSI correction quantity read out by the multiplex number extracting section 232c serving as the second memory control section. Accordingly, in the mobile station 2-i, the aforesaid RSSI compensating section 23-5 comprises the multiplex number extracting section 232c, the memory section 23-6, the second memory control section and the second detected signal strength indicator correcting section.

As described above, with the CDMA communication system 1 according to this modification, only the multiplex number is broadcasted from the base station 3 to the mobile station 2-i side while in the mobile station 2-i, an RSSI correction quantity is obtained in the basis of the multiplex number broadcasted from the base station 3 to correct the detected RSSI for compensating for the error in the RSSI detection. In this case, this can enhance the RSSI detection accuracy in the mobile stations 2-i while promoting the power-saving and simplification in the base station 3.

In this connection, the memory sections 23-3 and 23-6 in the mobile stations 2-i can also be provided in common, which contributes to the size reduction of the mobile stations 2-i.

(A2) Description of Second Modification of First Embodiment

Figure 9:
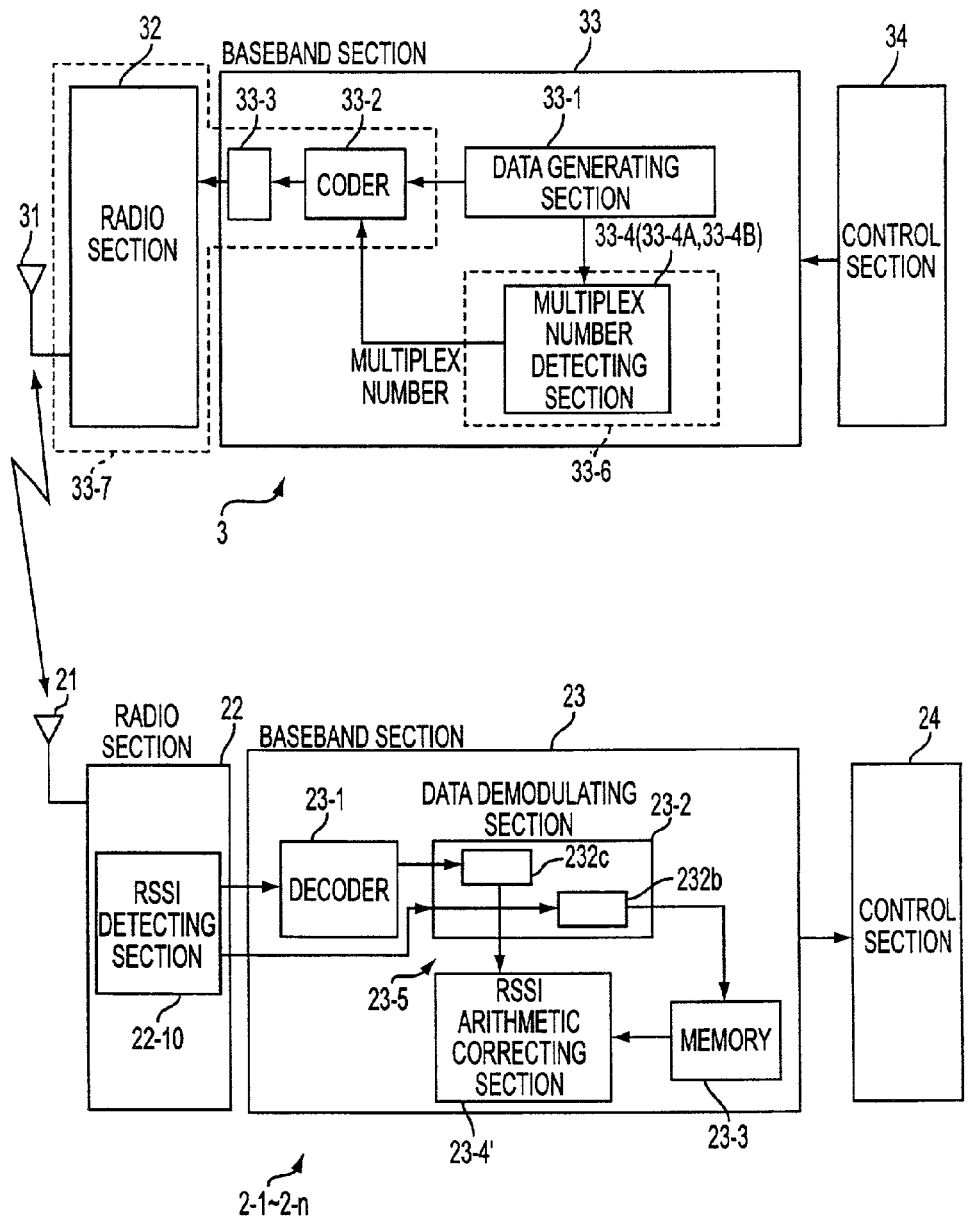
FIG. 9 is a block diagram showing a second modification of the base station and the mobile station illustrated in FIG. 2.

FIG. 9 is a block diagram showing a second modification of the CDMA communication system described above with reference to FIG. 2. In the CDMA communication system 1 shown in FIG. 9, as compared with the system configuration described above with reference FIG. 8, in the mobile stations 2-i, an RSSI arithmetic correcting section 23-4' is provided in place of the RSSI correcting section 23-4 and the memory section 23-6 is omitted.

That is, in this case, the base station 3 includes, as the aforesaid compensation parameter generating section 33-6, a multiplex number detecting section 33-4 (the detecting section 33-4A or 33-4B is also acceptable) which detects the transmission channel multiplex number for the mobile stations 2-i as the aforesaid compensation parameter.

On the other hand, in the mobile stations 2-i, the RSSI arithmetic correcting section (third detected signal strength indicator correcting section) 23-4', when the number of multiplexes extracted by the multiplex number extracting section 232c is taken as n and the RSSI estimated by the memory section 23-3 is taken as $RSSI_1$, corrects the $RSSI_1$, (to an $RSSI_2$) through an operation expressed by the following equation (2).

$$RSSI_2 = RSSI_1 + B(n) \qquad (2)$$

In this equation (2), B(n) denotes a correction offset value corresponding to the multiplex number n, and for example, is given by the following equation (3).

$$B(n) = b(1 - e^{-an}) \qquad (3)$$

where b and a signify an identification coefficient.

That is, in this second modification, the mobile station 2-i includes, as the aforesaid RSSI compensating section 23-6, a multiplex number extracting section 232c functioning as a multiplex number receiving section for receiving the transmission channel multiplex number from the base station 3 and an RSSI arithmetic correcting section 23-4' for correcting the RSSI on the basis of the transmission channel multiplex number, received by the multiplex number extracting section 232c, through a predetermined arithmetic operation.

Accordingly, in the CDMA communication system 1 according to the second modification, in the mobile stations 2-i, an RSSI correction quantity (equivalent to the aforesaid A×n+B) is obtained on the basis of the identical-carrier transmission channel multiplex number, broadcasted from the base station 3 through a broadcasting channel, through the arithmetic operation so that the RSSI estimated by the memory section 23-3 is corrected according to the correction quantity, thus compensating for an error in the RSSI detection originating from the difference in transmission channel multiplex number.

In this case, the memory section 23-6 for estimating an RSSI corresponding to an output voltage of the RSSI detecting section 22-10 becomes unnecessary and the RSSI correction quantity is obtainable with higher precision as compared with the use of the memory section 23-6, it is possible to compensate accurately for an error in the RSSI detection originating from the difference in transmission channel multiplex number while promoting the size reduction of the mobile stations 2-i.

(B) Description of Second Embodiment

Figure 10:
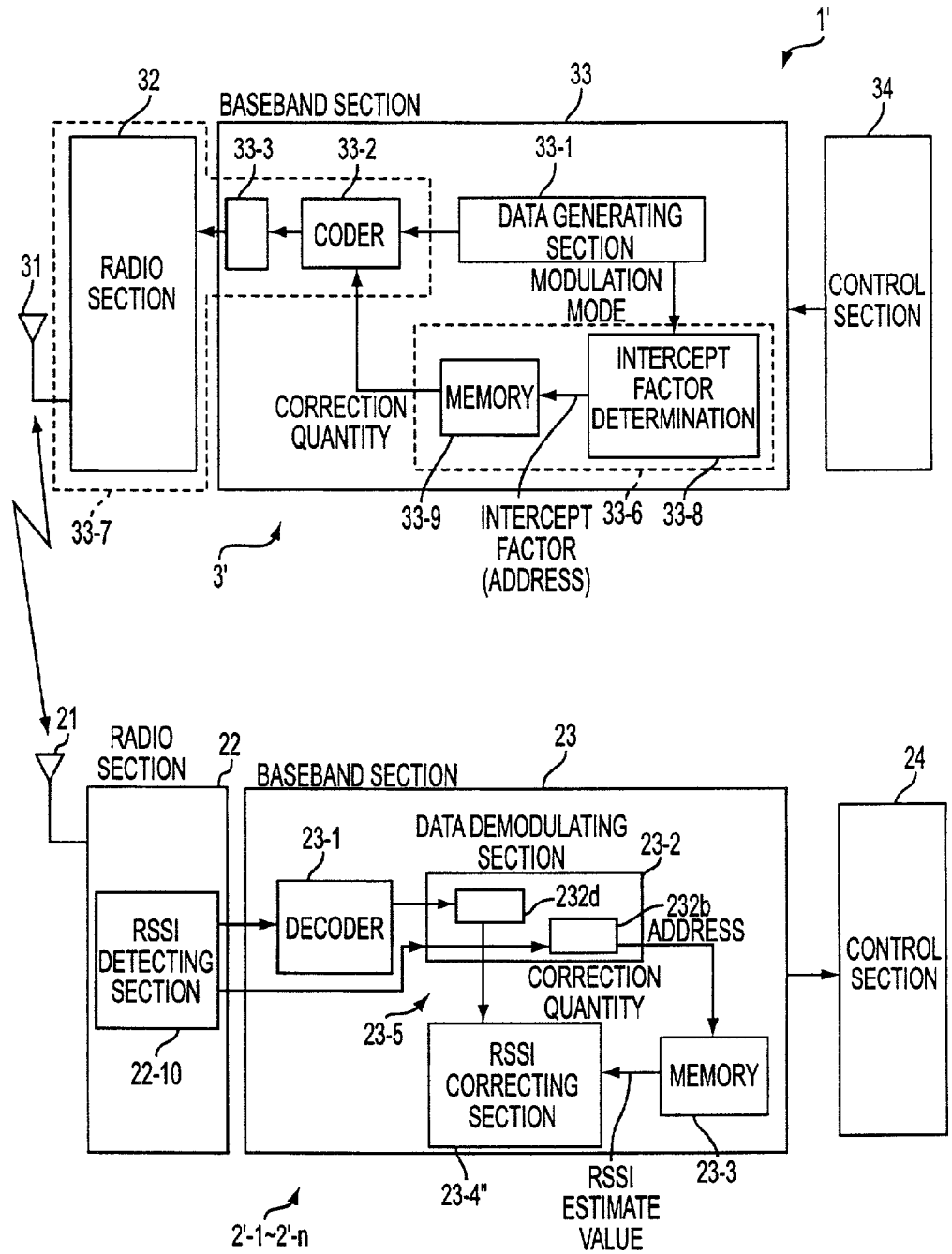
FIG. 10 is a block diagram showing a configuration of a radio communication system (base station and mobile station) according to a second embodiment of the present invention.

FIG. 10 is a block diagram showing a configuration of a radio communication system according to a second embodiment of the present invention. In FIG. 10, a radio communication system 1' is made up of a base station 3' made to handle a plurality of types of modulation modes and software radio equipment (mobile stations, terminal stations) 2'-1 to 2'-n capable of making communications with the base station 3' in an arbitrary modulation mode of the modulation modes the base station 3' handles, within the visitor zone of the base station 3'. Also in this case, the base station 3' is designed to be capable of performing the data interchange with a network 5 in a state accommodated in an exchange similar to that shown in FIG. 1.

In addition, as FIG. 10 shows, the base station 3' differs from that shown in FIG. 2 in that an intercept factor determining section 33-8 and a memory section 33-9 are provided as the aforesaid compensation parameter generating section 33-6, and each of the mobile stations 2'-i differs from that shown in FIG. 2 in that an RSSI correction quantity extracting section 232d and an RSSI correcting section 23-4" are provided as the aforesaid RSSI compensating section 23-5.

In the base station 3', the intercept factor determining section 33-8 is for determining an intercept factor (see the table 2 shown above) corresponding to a modulation mode to be used for communication with the mobile stations 2'-i, and in this case, a read address for the memory section 33-9 is produced in corresponding relation to the intercept factor determined.

The memory section 33-9 is for previously storing RSSI correction quantities as information in the form of a table according to differences in intercept factor (that is, differences in modulation mode), with an RSSI correction quantity, for the mobile stations 2-i, being read out from the corresponding address area in relation to a read address from the aforesaid intercept factor determining section 33-8 to be outputted to the coder 33-2.

That is, in this second embodiment, the compensation parameter generating section 33-6 is designed to generate information on a modulation mode (in this case, an RSSI correction quantity for a modulation mode (intercept factor)) as a compensation parameter needed for the compensation for an error in the RSSI detection occurring in the mobile stations 2'-i due to a waveform difference arising from a difference in modulation mode for a transmission signal to the mobile stations 2'-i.

In this connection, as in the case of the first embodiment, the RSSI correction quantity is also stored in broadcasting channel data by the coder 33-2 and broadcasted through a broadcasting channel to the mobile stations 2'-i.

On the other hand, in the mobile stations 2'-i, the RSSI correction quantity extracting section 232d of the data demodulating section 23-2 is for extracting the aforesaid RSSI correction quantity from the broadcasting channel data received from the base station 3', and the RSSI correcting section 23-4" is for correcting an RSSI, estimated (detected) in the memory section 23-3 on the basis of an output voltage of the RSSI detecting section 22-10 (logarithmic amplifier 100), according to an RSSI correction quantity extracted by the RSSI correction quantity extracting section 232d.

That is, in the mobile stations 2'-i of the second embodiment, the RSSI compensating section 23-5 is made to compensate for an error in the RSSI detection occurring due to a difference in modulation mode for a transmission signal from the base station 3' originating from an input-output characteristic with input waveform dependency, the logarithmic amplifier 100 shows, on the basis of information on the modulation mode for the transmission signal from the base station 3'.

With the above-described configuration, the radio communication system 1' according to the second embodiment can achieve the compensation for the detection error in the mobile stations 2'-i by broadcasting an RSSI correction quantity according to a difference in modulation mode (intercept factor) from the base station 3' to the mobile stations 2'-i even when the system 1' handles a plurality of modulation modes and an error in RSSI detection can occur in the mobile stations 2'-i due to a difference in modulation mode used.

Accordingly, even in the software radio equipment 2'-i, considerable improvement of the RSSI detection accuracy becomes feasible, and for example, the presence or absence of transmitted electric waves from illegal radio equipment is estimable with high precision on the basis of an RSSI, thus providing an illegal radio equipment controlling apparatus with an extremely high performance.

In addition, in this second embodiment, the base station 3' obtains an RSSI correction quantity on the basis of an intercept factor to broadcast only the correction quantity to the mobile stations 2'-i, and this contributes to the simplification (size reduction) of the mobile stations 2'-i.

Incidentally, in the above-described example, although an RSSI correction quantity is acquired from an intercept factor in the base station 3' to broadcast only the RSSI correction quantity, it is also appropriate that, for example, as in the case of the above-described first and second modifications of the first embodiment, only an intercept factor (or the modulation mode itself) is broadcasted from the base station 3' to the mobile stations 2'-i where an RSSI correction quantity is obtained on the basis of the broadcasted information in the mobile station 2'-i side.

(C) Others

In the above-described embodiments, although limitation is not particularly imposed on the number of times of broadcast (transmission) of a compensation parameter [correction quantity corresponding to the transmission channel multiplex number, transmission channel multiplex number, intercept factor (modulation mode), or the like] from the base station 3(3') to the mobile stations 2-$i$ (2'-$i$), in fact it is preferable that the broadcasting is made more than one times. For example, for broadcasting information on modulation mode, it is preferable that the broadcasting is made for each change in modulation mode. However, in the case of the correction quantity corresponding to the transmission channel multiplex number or the transmission channel multiplex number, since there is a possibility that the transmission channel multiplex number varies frequently, it is preferable that the broadcasting is made at a constant interval through the use of a timer or the like.

In addition, the above-described embodiments can also be used in a state combined with each other. For example, in a case in which a terminal station is such a multimode terminal as to have a TACS mode+a CDMA mode, such a combination can compensate for an RSSI detection error stemming from a difference in transmission signal waveform between TACS and CDMA and further compensate for an RSSI detection error arising from a difference in transmission channel multiplex number in the CDMA mode.

Still additionally, in the above-described embodiments, although a compensation parameter is broadcasted through a broadcasting channel to the mobile stations, the present invention is not limited to this. For example, it is also possible that a broadcasting channel for the compensation parameter is newly defined to broadcast the compensation parameter through the use of this channel.

The present invention is not limited to the above-described embodiments and modifications, and it covers all changes and modifications of the embodiments of the invention herein which do not constitute departures from the spirit and scope of the invention.

INDUSTRIAL APPLICABILITY

As described above, according to the present invention, the received signal strength indicator detection error, which can occur in a terminal station due to a difference in waveform of a transmission signal from a base station, can be compensated for by broadcasting a compensation parameter from the base station to the terminal station. This improves the received signal strength indicator detection accuracy considerably in the terminal station, which leads to significant improvement of accuracy on processing or control based on a received signal strength indicator; therefore, the extremely high availability would be attainable.

What is claimed is:

1. A radio communication system comprising a base station transmitting radio signals having different waveforms of multiplexed signals varying according to a number of multiplexes in said multiplexed signal and a terminal station for making radio communications with said base station,
said base station including:
a compensation parameter generating section for generating a compensation parameter needed for compensating for a possible error in detection of a received signal, occurring in said terminal station stemming from said difference in transmission signal waveform to be transmitted to said terminal station; and
a transmitting section for transmitting said compensation parameter generated by said compensation parameter generating section, to said terminal station,
said terminal station including:
a received signal strength detecting section for detecting a received signal strength of a transmission signal from said base station through the use of a required amplifier, and
a received signal strength compensating section for compensating for, on the basis of said compensation parameter from said base station, the error in the received signal strength detection in said received signal strength detecting section, occurring according to the difference in said transmitted transmission signal waveform.

2. A radio communication system according to claim 1, wherein, in a case in which each of said base station and said terminal station conforms to a plurality of types of modulation modes and a waveform of said transmission signal varies according so said modulation modes,
said compensation parameter generating section of said base station is designed to generate information on a modulation mode for said transmission signal as said compensation parameter, and
said received signal strength compensating section of said terminal station is designed to correct an error in detection of a received signal strength, which occurs according to a difference in transmission signal modulation mode due to an input-waveform-dependent input-output characteristic of said amplifier, on the basis of said information on transmission signal modulation mode from said base station.

3. A radio communication system comprising a base station transmitting radio signals having different waveforms and a terminal station for making radio communications with said base station,
said base station including:
a compensation parameter generating section for generating a compensation parameter needed for compensating for a possible error in detection of a received signal, occurring in said terminal station stemming from a difference in transmission signal waveform to said terminal station; and
a transmitting section for transmitting said compensation parameter generated by said compensation parameter generating section, to said terminal station,
said terminal station including:
a received signal strength detecting section for detecting a received signal strength of a transmission signal from said base station through the use of a required amplifier; and a received signal strength compensating section for compensating for, on the basis of said compensation parameter from said base station, the error in the received signal strength detection in said received signal strength detecting section, occurring according to the difference in transmission signal waveform,
wherein, in a case in which said radio communication node is a code division multiple access communication node and a waveform of a multiplexed signal to be transmitted to said terminal station varies according to the number of multiplexes in said multiplexed signal,
said compensation parameter generating section of said base station includes:
a multiplex number detecting section for detecting information on the number of multiplexes in a transmission multiplexed signal to said terminal station;
a first correction memory section for previously storing a correction quantity on a received signal strength indicator on the basis of a difference in number of multiplexes of said transmission multiplexed signal; and a first memory control section for reading our, from said first correction memory section, a correction quantity corresponding to said information on the number of multiplexes detected by said multiplex number detecting section as said compensation parameter for said terminal station, and said received signal strength compensating section of said terminal station includes:

a correction quantity receiving section for receiving said correction quantity from said base station; and a first detected signal strength correcting section for correcting said received signal strength, detected by said received signal strength detecting section, according to said correction quantity received by said correction quantity receiving section.

4. A radio communication system comprising a base station transmitting radio signals having different waveforms and a terminal station for making radio communications with said base station, said base station including:

a compensation parameter generating section for generating a compensation parameter needed for compensating for a possible error in detection of a received signal, occurring in said terminal station stemming from a difference in transmission signal waveform to said terminal station; and a transmitting section for transmitting said compensation parameter generated by said compensation parameter generating section, to said terminal station, said terminal station including:

a received signal strength detecting section for detecting a received signal strength of a transmission signal from said base station through the use of a required amplifier; and a received signal strength compensating section for compensating for, on the basis of said compensation parameter from said base station, the error in the received signal strength detection in said received signal strength detecting section, occurring according to the difference in transmission signal waveform, wherein, in a case in which said radio communication node is a code division multiple access communication node and a waveform of a multiplexed signal to be transmitted to said terminal station varies according to the number of multiplexes in said multiplexed signal, said compensation parameter generating section of said base station includes:

a multiplex number detecting section for detecting information on the number of multiplexes of a transmission multiplexed signal to said terminal station as a compensation parameter for said terminal station, and said received signal strength indicator compensating section of said terminal station includes:

a multiplex number receiving section for receiving said information on the number of multiplexes from said base station;

a second correction memory section for previously storing a correction quantity on a received signal strength on the basis of a difference in number of multiplexes in said transmission signal;

a second memory control section for reading out a correction quantity corresponding to said information on the number of multiplexes, received by said multiplex number receiving section, from said second correction memory section; and a second detected signal strength correcting section for correcting said received signal strength, detected by said received signal strength detecting section, according to said correction quantity read out by said second memory control section.

5. A radio-communication system comprising a base station transmitting radio signals having different waveforms and a terminal station for making radio communications with said base station, said base station including:

a compensation parameter generating section for generating a compensation parameter needed for compensating for a possible error in detection of a received signal, occurring in said terminal station stemming from a difference in transmission signal waveform to said terminal station; and a transmitting section for transmitting said compensation parameter generated by said compensation parameter generating section, to said terminal station, said terminal station including:

a received signal strength detecting section for detecting a received signal strength of a transmission signal from said base station through the use of a required amplifier; and a received signal strength compensating section for compensating for, on the basis of said compensation parameter from said base station, the error in the received signal strength detection in said received signal strength detecting section, occurring according to the difference in transmission signal waveform, wherein, in a case in which said radio communication node is a code division multiple access communication node and a waveform of a multiplexed signal to be transmitted to said terminal station varies according to the number of multiplexes in said multiplexed signal, said compensation parameter generating section of said base station includes:

a multiplex number detecting section for detecting information on the number of multiplexes of a transmission multiplexed signal to said terminal station as said compensation parameter, and said received signal strength compensating section of said terminal station includes:

a multiplex number receiving section for receiving said information on the number of multiplexes from said base station; and a third detected signal strength correcting section for correcting a received signal strength detected by said received signal strength detecting section on the basis of said information on the number of multiplexes received by said multiplex number receiving section through the use of a predetermined arithmetic operation.

6. A received signal strength compensating method for use in a radio communication system comprising a base station transmitting radio signals having different waveforms of multiplexed signals varying according to a number of multiplexes in said multiplexed signal and a terminal station for making radio communications with said base station, the method comprising:

broadcasting a compensation parameter needed for compensating for a possible error in detection of a received signal, occurring in said terminal station stemming from said difference in waveform of a transmission signal from said base station to said terminal station; and in said terminal station, detecting a received signal strength of said transmission signal through the use of a required amplifier, and compensating for, on the basis of said compensation parameter broadcasted from said base station, the error in the received signal strength detection occurring according to the difference in said transmitted transmission signal waveform.

7. A base station for use in a radio communication system, said base station making radio communications with a terminal station by radio signals having different waveforms of multiplexed signals varying according to a number of multiplexes in said multiplexed signal comprising:

a compensation parameter generating section for generating a compensation parameter needed for compensating for a possible error in detection of a received signal strength, occurring in said terminal station stemming from said difference in transmission signal waveform to said terminal station; and a transmitting section for transmitting said compensation parameter generated by said compensation parameter generating section, to said terminal station.

8. A base station for use in a radio communication system according to claim 7, wherein, in a case in which each of said base station and said terminal station conforms to a plurality of types of modulation modes and a waveform of said transmission signal varies according to said modulation modes, said compensation parameter generating section is designed to generate information on a modulation mode for said transmission signal as said compensation parameter.

9. A base station for use in a radio communication system, said base station making radio communications with a terminal station by radio signals having different waveform, comprising:

a compensation parameter generating section for generating a compensation parameter needed for compensating for a possible error in detection of a received signal strength, occurring in said terminal station stemming from a difference in transmission signal waveform to said terminal station; and a transmitting section for transmitting said compensation parameter generated by said compensation parameter generating section, to said terminal station, wherein, in a case in which said radio communication node is a code division multiple access communication node and a waveform of a multiplexed signal to be transmitted to said terminal station varies according to the number of multiplexes in said multiplexed signal, said compensation parameter generating section includes:

a multiplex number detecting section for detecting information on the number of multiplexes of a transmission multiplexed signal to said terminal station as a compensation parameter for said terminal station.

10. A base station for use in a radio communication system, said base station making radio communications with a terminal station by radio signals having different waveform, comprising:

a compensating parameter generating section for generating a compensation parameter needed for compensating for a possible error in detection of a received signal strength, occurring in said terminal station stemming from a difference in transmission signal waveform to said terminal station; and a transmitting section for transmitting said compensation parameter generated by said compensation parameter generating section, to said terminal station, wherein, in a case in which said radio communication node is a code division multiple access communication node and a waveform of a multiplexed signal to be transmitted to said terminal station varies according to the number of multiplexes in said multiplexed signal, said compensation parameter generating section includes:

a multiplex number detecting section for detecting information on the number of multiplexes of a transmission multiplexed signal to said terminal station as a compensation parameter for said terminal station.

11. A base station for use in a radio communication system, said base station making radio communications with a terminal station by radio signals having different waveform, comprising:

a compensation parameter generating section for generating a compensation parameter needed for compensating for a possible error in detection of a received signal strength, occurring in said terminal station stemming from a difference in transmission signal waveform to said terminal station; and a transmitting section for transmitting said compensation parameter generated by said compensation parameter generating section, to said terminal station, wherein, in a case in which said radio communication method is a code division multiple access communication method and a waveform of a multiplexed-signal to be transmitted to said terminal station varies according to the number of multiplexes in said multiplexed signal, said compensation parameter generating section includes;

a multiplex number detecting section for detecting information on the number of multiplexes in a transmission multiplexed signal to said terminal station, a first correction memory section for previously storing a correction quantity on a received signal strength on the basis of a difference in number of multiplexes of said transmission multiplexed signal; and a first memory control section for reading out, from said first correction memory section, a correction quantity corresponding to said information on the number of multiplexes detected by said multiplex number detecting section as said compensation parameter for said terminal station.

12. A base station for use in a radio communication system according to claims 11, wherein a plurality of transmission data generating sections are provided to generate transmission data to be multiplexed as said transmission multiplexed signal, and said multiplex number detecting section includes:

an enable signal counting section for counting the number of enable signals for said transmission data generating sections to detect said information on the number of multiplexes.

13. A base station for use in a radio communication system according to claim 12, wherein said plurality of transmission data generating sections are separated into a plurality of groups.

said enable signal counting is provided for each of said groups to count the number of enable signals in units of said groups, and an adding section is provided to add up the count results in said enable signal counting sections for output said information on the number of multiplexes.

14. A base station for use in a radio communication system according to claim 12, wherein said enable signal counting section uses each of said enable signals for said plurality of transmission data generating sections as a read address signal, and
   a multiplex number detection memory section is provided which previously stores said information on the number of multiplexes in an address area corresponding to said read address signal.

15. A terminal station for use in a radio communication system, said terminal station making radio communications with a base station, comprising:
   a received signal strength detecting section for detecting a received signal strength of a transmission signal from said base station through the use of a required amplifier; and
   a received signal strength compensating section for compensating for, on the basis of a compensation parameter needed for compensation for a possible error in detection of a received signal strength occurring due to a difference in waveforms of multiplexed signals varying according to a number of multiplexes in said multiplexed signal of said transmission signal and generated in said base station and transmitted therefrom, the error in the received signal strength detection in said received signal strength detecting section, occurring according to the difference in the transmission signal waveform.

16. A terminal station for use in a radio communication system according to claim 15, wherein, in a case in which said base station conform to a plurality of types of modulation modes and as waveform of said transmission signal varies according to said modulation modes, with said base station being made to generate information on a modulation mode for said transmission signal as said compensation parameter,
   said received signal strength compensating section is made to compensate for an error in received signal strength detection occurring due to a difference in modulation mode for said transmission signal stemming from an input-waveform-dependent input-output characteristic of said logarithmic amplifier, on the basis of said information on the modulation mode for said transmission signal from said base station.

17. A terminal station for use in a radio communication system, said terminal station making radio communications with a base station, comprising:
   a received signal strength detecting section for detecting a received signal strength of a transmission signal from said base station through the use of a required amplifier; and
   a received signal strength compensation section for compensating for, on the basis of a compensation parameter needed for compensation for a possible error in detection of a received signal strength occurring due to a difference in waveform of said transmission signal and generated in said base station and transmitted therefrom, the error in the received signal strength detection in said received signal strength detecting section, occurring according to the difference in the transmission signal waveform,
   wherein, in a case in which said radio communication node is a code division multiple access communication node and a waveform of a multiplexed signal to be transmitted from said base station varies according to the number of multiplexes in said multiplexed signal, with information on the number of multiplexes in said transmission multiplexed signal being transmitted as said compensation parameter from said base station,
   said received signal strength compensating section includes:
      a multiplex number receiving section for receiving said information on the number of multiplexes from said base station;
      a second correction memory section for previously storing a correction quantity on a received signal strength on the basis of a difference in number of multiplexes in said transmission signal;
      a second memory control section for reading out a correction quantity corresponding to said information on the number of multiplexes, received by said multiplex number receiving section, from said second correction memory section; and
      a second detected signal strength correcting section for correcting said received signal strength, detected by said received signal strength detecting section, according to said correction quantity read our by said second memory control section.

18. A terminal station for use in a radio communication system, said terminal station making radio communications with a base station, comprising:
   a received signal strength detecting section for detecting a received signal strength of a transmission signal from said base station through the use of a required amplifier; and
   a received signal strength compensating section for compensating for, on the basis of a compensation parameter needed for compensation for a possible error in detection of a received signal strength occurring due to a difference in waveform of said transmission signal and generated in said base station and transmitted therefrom, the error in the received signal strength detection in said received signal strength detection section, occurring according to the difference in the transmission signal waveform,
   wherein, in a case in which said radio communication node is a code division multiple access communication node and a waveform of a multiplexed signal to be transmitted from said base station varies according to the number of multiplexes in said multiplexed signal, with information on the number of multiplexes in said transmission multiplexed signal being transmitted as said compensation parameter from said base station,
   said received signal strength compensating section includes:
      a multiplex number receiving section for receiving said information on the number of multiplexes from said base station; and
      a third detected signal strength correcting section for correcting a received signal strength detected by said received signal strength detecting section on the basis of said information on the number of multiplexes received by said multiplex number receiving section through the use of a predetermined arithmetic operation.

19. A terminal station for use in a radio communication system, said terminal station making radio communications with a base station, comprising:

a received signal strength detecting section for directing a received signal strength of a transmission signal from said base station through the use of a required amplifier; and a received signal strength compensating section for compensating for, on the basis of a compensation parameter needed for compensation for a possible error in dejection of a received signal strength occurring due to a difference in waveform of said transmission signal and generated in said base station and transmitted therefrom the error in the received signal strength detection in said received signal strength detecting section, occurring according to the difference in the transmission signal waveform, wherein, in a case in which said radio communication node is a code division multiple access communication node and a waveform of a multiplexed signal to be transmitted from said base station varies according to the number of multiplexes in said multiplexed signal, with a received signal strength correction quantity to be taken according to a difference in the number of multiplexes in said transmission multiplexed signal being transmitted as said compensation parameter from said base station, said received signal strength compensating section includes:

a correction quantity receiving section for receiving said correction quantity from said base station; and a first detected signal strength correcting section for correcting said received signal strength, detected by said received signal strength detecting section, according to said correction quantity received by said correction quantity receiving section.

* * * * *